US010734012B2

(12) United States Patent
Poulsen

(10) Patent No.: US 10,734,012 B2
(45) Date of Patent: Aug. 4, 2020

(54) LOW POWER, HIGH BANDWIDTH, LOW LATENCY DATA BUS

(71) Applicant: SYNAPTICS INCORPORATED, San Jose, CA (US)

(72) Inventor: Jens Kristian Poulsen, Waterloo (CA)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/125,617

(22) Filed: Sep. 7, 2018

(65) Prior Publication Data

US 2019/0074026 A1 Mar. 7, 2019

Related U.S. Application Data

(60) Provisional application No. 62/555,638, filed on Sep. 7, 2017, provisional application No. 62/678,993, filed on May 31, 2018, provisional application No. 62/721,412, filed on Aug. 22, 2018.

(51) Int. Cl.
*G10L 21/055* (2013.01)
*G06F 3/16* (2006.01)

(52) U.S. Cl.
CPC ............ *G10L 21/055* (2013.01); *G06F 3/162* (2013.01)

(58) Field of Classification Search
CPC ............................... G10L 21/055; G06F 3/162
USPC ......................................................... 704/503
See application file for complete search history.

(56) References Cited

U.S. PATENT DOCUMENTS

| 2004/0019725 | A1* | 1/2004 | Ellerbrock | ............ | H04L 12/417 |
| | | | | | 710/305 |
| 2010/0158037 | A1* | 6/2010 | Heinke | ................ | H04L 12/403 |
| | | | | | 370/445 |
| 2012/0120082 | A1* | 5/2012 | Ku | ................... | H03K 19/00315 |
| | | | | | 345/520 |
| 2014/0281079 | A1* | 9/2014 | Biskup | ............... | G06F 13/4022 |
| | | | | | 710/110 |
| 2017/0153684 | A1* | 6/2017 | Balasubramanian | ... | G06F 1/324 |

* cited by examiner

*Primary Examiner* — Bharatkumar S Shah
(74) *Attorney, Agent, or Firm* — Haynes and Boone, LLP

(57) ABSTRACT

Data bus systems and methods include a device controller coupled to a first interface for digital audio data communications in accordance with a first communications protocol, the device controller including a master bus controller for controlling a multi-drop bus in accordance with a second communications protocol; and a first slave device coupled to the multi-drop bus and configured to transmit and receive digital audio data communications with the device controller in accordance with the second communications protocol. Each transmission line end is terminated using the device attached at one end of the transmission line and by another device attached at the other end and reflections due to mismatches in impedance by inclusion of intermediate signaling nodes are controlled to allow multi-drop device support and high speed signaling. The second communications protocol supports multiple audio data rates using a fixed frame format.

20 Claims, 19 Drawing Sheets

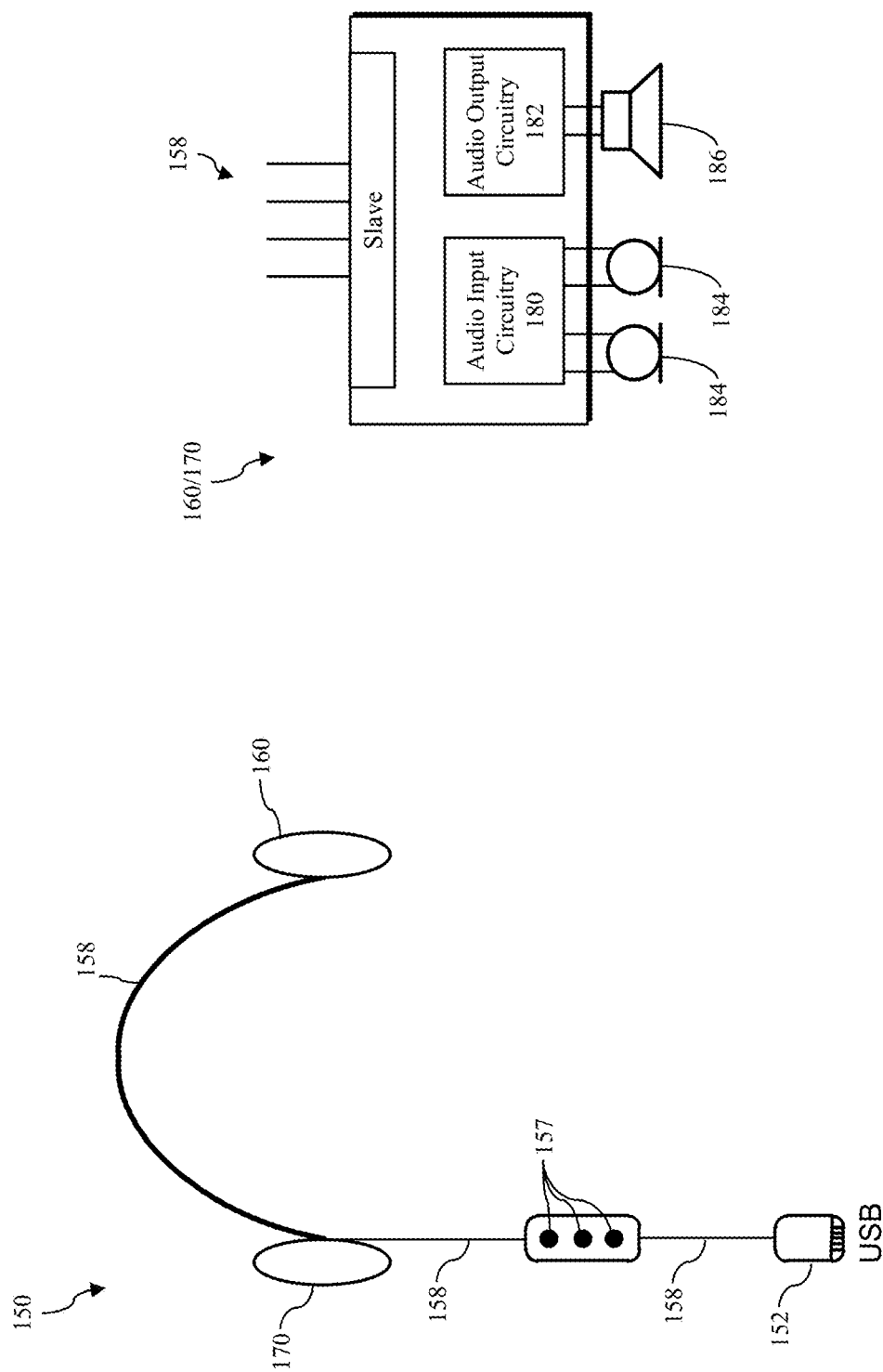

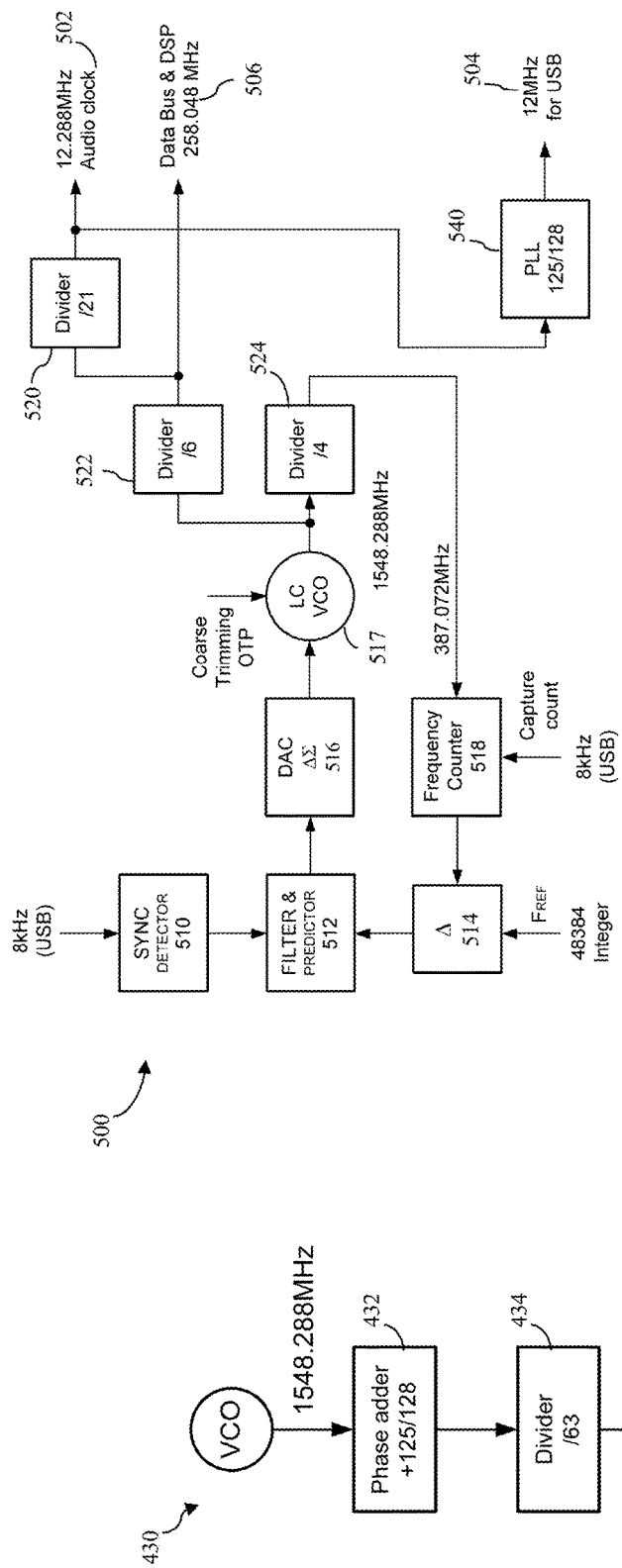
FIG. 6A
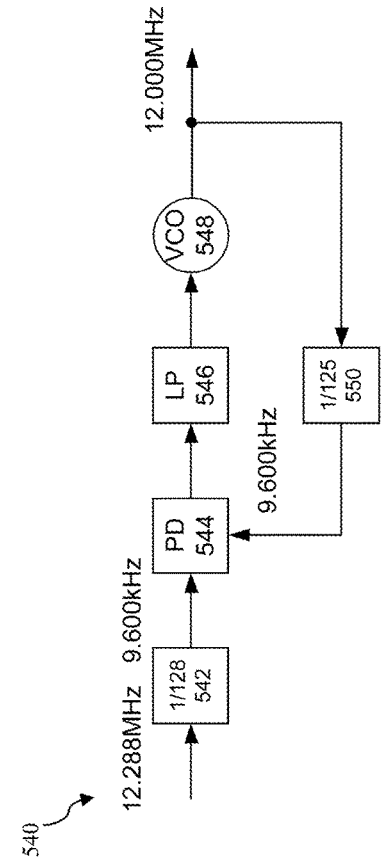
FIG. 6B
FIG. 5B

| 3072 kHz sync 6144k line rate | | | |
|---|---|---|---|
| 0 | 1 | CMD | 16 bits master audio | Two-way |

| | | | |
|---|---|---|---|
| R | Two-way | 16 bits slave audio | Two-way |

FIG. 9A

| 3200 kHz sync 9600 line rate | | | | |
|---|---|---|---|---|
| 0 | 1 | CMD | 10 bits master audio | One way |
| One way | R | Two-way | 10 bits slave audio | Two-way |
| | | | 12 bits slave audio | |

FIG. 9B

| 3200 kHz sync 9600 line rate | | | | |
|---|---|---|---|---|
| 0 | 1 | CMD | 11 bits master audio | Two-way | One way |
| One way | | 11 bits master audio | 11 bits slave audio | R | Two-way |

FIG. 9C

768 kHz sync – 144 bits per frame

| 0 | 1 | Two-way | Master audio 32 bits | CMD | Slave audio 32 bits | Two-way | Master audio 32 bits | CMD | Slave audio 32 bits | Two-way |

FIG. 9D

800 kHz sync – 144 bits per frame

| 0 | 1 | Two-way | Master audio 20 bits | CMD | Slave audio 20 bits | Two-way | Master audio 20 bits | CMD | Slave audio 20 bits | Two-way | Master audio 20 bits | CMD | Slave audio 20 bits | Two-way |

FIG. 9E

| Symbol | Description | Driver | Functionality |
|---|---|---|---|
| 0 1 | A zero to one transition used by the PLL in a slave device to synchronize to the master | Master | Synchronization |
| OP0 | Operation bit 0 signifying command | Master | Command |
| DV0 | Device bit 0 signifying the addressed device number | Master | Command |
| PAR | Parity bit, even parity generated by the master based on values from current command | Master | Data integrity |
| S | Stop bit. This bit is used to mark the passing of the last sync symbol in a frame. | Master | Synchronization |
| D0 | Data field bit 0 within write command (master writes to slave) | Master | Command |
| CMD | Command | Master | Command |
| R | Response | Slave | Response |
| D0 | Data field bit 0 within read command (read data from slave) | Slave | Command |
| 32 bits master audio | Transfer audio from master device to slave device | Slave device | Audio data |
| 16 bits slave audio | Transfer audio from slave device to master device | Slave device | Audio data |
| Two-way | A double time-slot delay used during handover from master to slave | None | Flush transmission line |

FIG. 9F

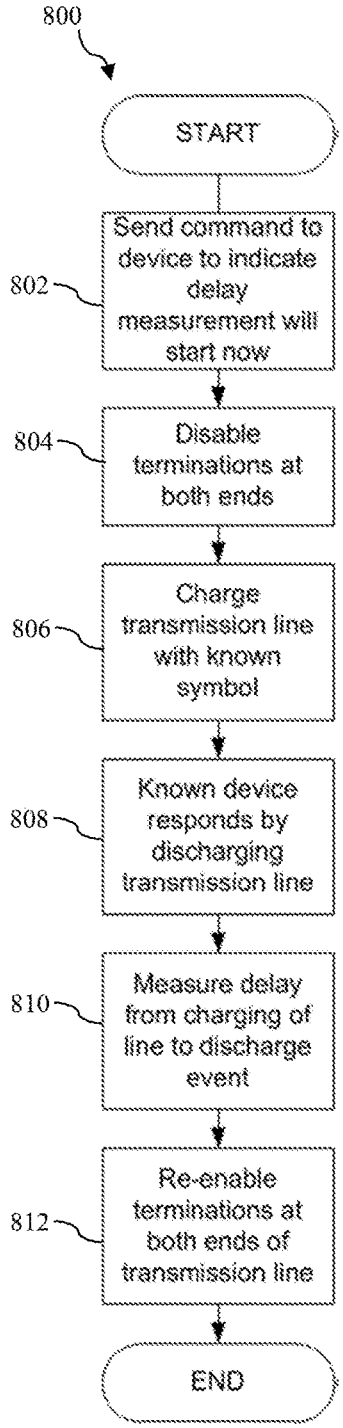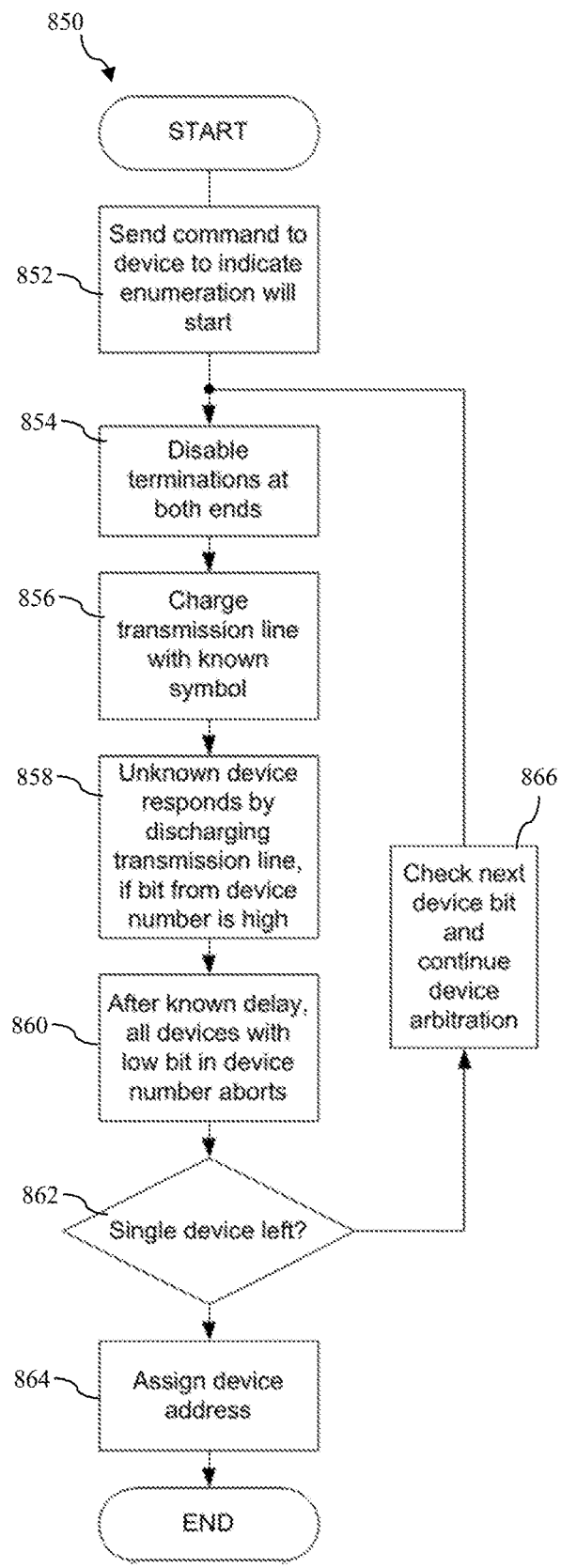
FIG. 10A
FIG. 10B

LOW POWER, HIGH BANDWIDTH, LOW LATENCY DATA BUS

CROSS-REFERENCE TO RELATED APPLICATIONS

This application claims priority to and the benefit of U.S. Provisional Patent Application No. 62/555,638, entitled "Low Power, High Bandwidth, Low Latency Data Bus," filed Sep. 7, 2017; U.S. Provisional Patent Application No. 62/678,993, entitled "Earlink Controller," filed May 31, 2018; and U.S. Provisional Patent Application No. 62/721,412, entitled "Dynamic Timing Calibration Systems and Methods," filed Aug. 22, 2018; each of which is incorporated by reference herein in its entirety.

TECHNICAL FIELD

The present disclosure relates generally to data communications and, more particularly, for example, to systems and methods for communication of digital data between devices.

BACKGROUND

Various interfaces for transmitting and receiving digital data between electronic devices are known in the art. Existing interfaces, however, do not meet the needs of many modern systems. It is often desirable to enable high bandwidth communications for a variety of connected devices, while maintaining reliability and good signal quality, and meeting the need for low cost, low power devices. For example, an adaptive noise cancellation (ANC) headset may require complex and expensive equipment, and high bandwidth communications between the ANC headset and a host device may be desirable for certain applications, such as processing a noise cancellation signal on a host device.

In some approaches, high bandwidth communications is achieved through a digital communications link that terminates at the receiver. These approaches may provide satisfactory signal integrity for certain configurations, but if there is simultaneously a requirement for low power consumption, the static power consumption in the receiver termination may be undesirable. Further, many of these approaches are not optimized for low latency data transfer, because data communications could take a full sample period to be transferred over the digital communications link. Some systems often have additional requirements, such as supporting connections to multiple devices and supporting physical links meeting certain length requirements (e.g., 1-2 meters).

In view of the foregoing, there is a continued need in the art for improved digital data communications systems and methods.

SUMMARY

The present disclosure provides systems and methods that address the need in the art for improved digital data communications between physically connected devices. In various embodiments, data bus systems and methods include a device controller coupled to a first interface for digital audio data communications in accordance with a first communications protocol. The device controller includes a master bus controller for controlling a multi-drop bus in accordance with a second communications protocol. A first slave device is coupled to the multi-drop bus and configured to transmit and receive digital audio data communications with the device controller in accordance with the second communications protocol. Each transmission line is terminated using the device attached at one end of the transmission line and by another device attached at the other end, and reflections due to mismatches in impedance by inclusion of intermediate signaling nodes are controlled to allow multi-drop device support and high speed signaling. The second communications protocol may support multiple audio data rates using a fixed frame format.

In some embodiments, the first slave device and a second slave device connected to the bus are timed so that transmitted messages are sent as a sequence of forward or backward travelling waves, thereby enabling multi-drop high speed bi-directional communications using a terminated transmission line. In one embodiment, differential signaling is used for communications and one line is terminated in logic high and one line is terminated in logic low to reduce common mode interference. In one embodiment, differential signaling is used to lower EMI and termination of each transmission line is handled by setting the output driver to one of a high level and a low level according to a termination level when data is not transferred and the bus is idle, thereby enabling lower power consumption by transmission end points.

In some embodiments, intermediate nodes on the transmission line are connected to the transmission line with short interruption to a travelling wave, and stubs and/or disruptions of the transmission line are shorter than the shortest wavelength used for signaling. Power consumption may be reduced by using a signaling rate that is greater than a minimum required signaling rate and leaving the bus idle for a portion of every cycle, thereby reducing power loss in terminations. Power required for the signaling may be obtained by capacitive or inductive drop regulators thereby minimizing power loss in the regulators.

In some embodiments, delays between components are measured by charging the bus to a known value, disabling drivers at a beginning and an end of the transmission line to assure the bus is floating and not terminated during measurement, waiting for the devices to change a level on the bus, and measuring a transition delay. The drivers at each end of the transmission line may be disabled during enumeration of components attached to the bus by allowing multiple drivers to change a current bus state. The current bus state may be set by a controller and one or more devices can change the transmission line to the opposite value within a given time window allowing enumeration of devices. The device controller may further comprise a phase-locked loop providing a first clock signal for synchronizing communications in accordance with the first communications protocol, a second clock signal for synchronizing communications in accordance with the second communications protocol, and a third clock signal for use in audio data processing.

In various embodiments, the second communications protocol supports different communications bandwidths using a fixed frame structure. In some embodiments, the data port or data following each sync signal is modulated by a high frequency carrier thereby reducing current modulations in an audio band for lower interference in audio systems. The device controller, first slave device and second slave device may comprise an audio headset or other audio listening device. In some embodiments, terminations at the ends of the transmission lines are temporarily disabled during activation of the transmitters to reduce power consumption.

In various embodiments, a method comprises receiving and transmitting digital audio data across a first interface in accordance with a first communications protocol, controlling a multi-drop bus with a device controller in accordance with a second communications protocol, using a first slave device coupled to the multi-drop bus, receiving and transmitting digital audio data with the device controller in accordance with the second communications protocol, and setting the transmitters in each end of a transmission line to a known state to enable termination of any signal. In some embodiments, the second communications protocol may support multiple audio data rates using a fixed frame format.

The method of may further comprise using a phase-locked or delay-locked loop to generate a first clock signal for synchronizing communications in accordance with the first communications protocol, a second clock signal for synchronizing communications in accordance with the second communications protocol, and a third clock signal for use in audio data processing. In some embodiments, the second communications protocol supports different communications bandwidths using a fixed frame structure.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 1B and 1C illustrate an exemplary headset in accordance with one or more embodiments.

FIGS. 5A and 5B illustrate an exemplary clock solution in accordance with one or more embodiments.

FIGS. 6A and 6B illustrate an exemplary clock solution in accordance with one or more embodiments.

FIGS. 9A-F illustrate exemplary frame structures in accordance with one or more embodiments.

FIG. 10A illustrates a method for delay measurement of attached devices in accordance with one or more embodiments.

FIG. 10B illustrates a method for enumeration of attached devices in accordance with one or more embodiments.

The included drawings are for illustrative purposes and serve only to provide examples of possible systems and methods for the disclosed methods and system for providing context aware audio processing. These drawings in no way limit any changes in form and detail that may be made to that which is disclosed by one skilled in the art without departing from the spirit and scope of this disclosure.

DETAILED DESCRIPTION

The present disclosure addresses needs in the art for improved digital data communications between electronic devices. In various embodiments, systems and methods are disclosed for providing low power, high bandwidth, multi-drop, and/or low latency communications between a master device and one or more slave devices connected through a physical data link. The present disclosure provides numerous advantages over conventional systems and methods, including lower power consumption, a combination of high bandwidth and long link length, low and well controlled latency, support of multi-drop topology in addition to point-to-point connections, and simple synchronization between devices.

Figure 1A:
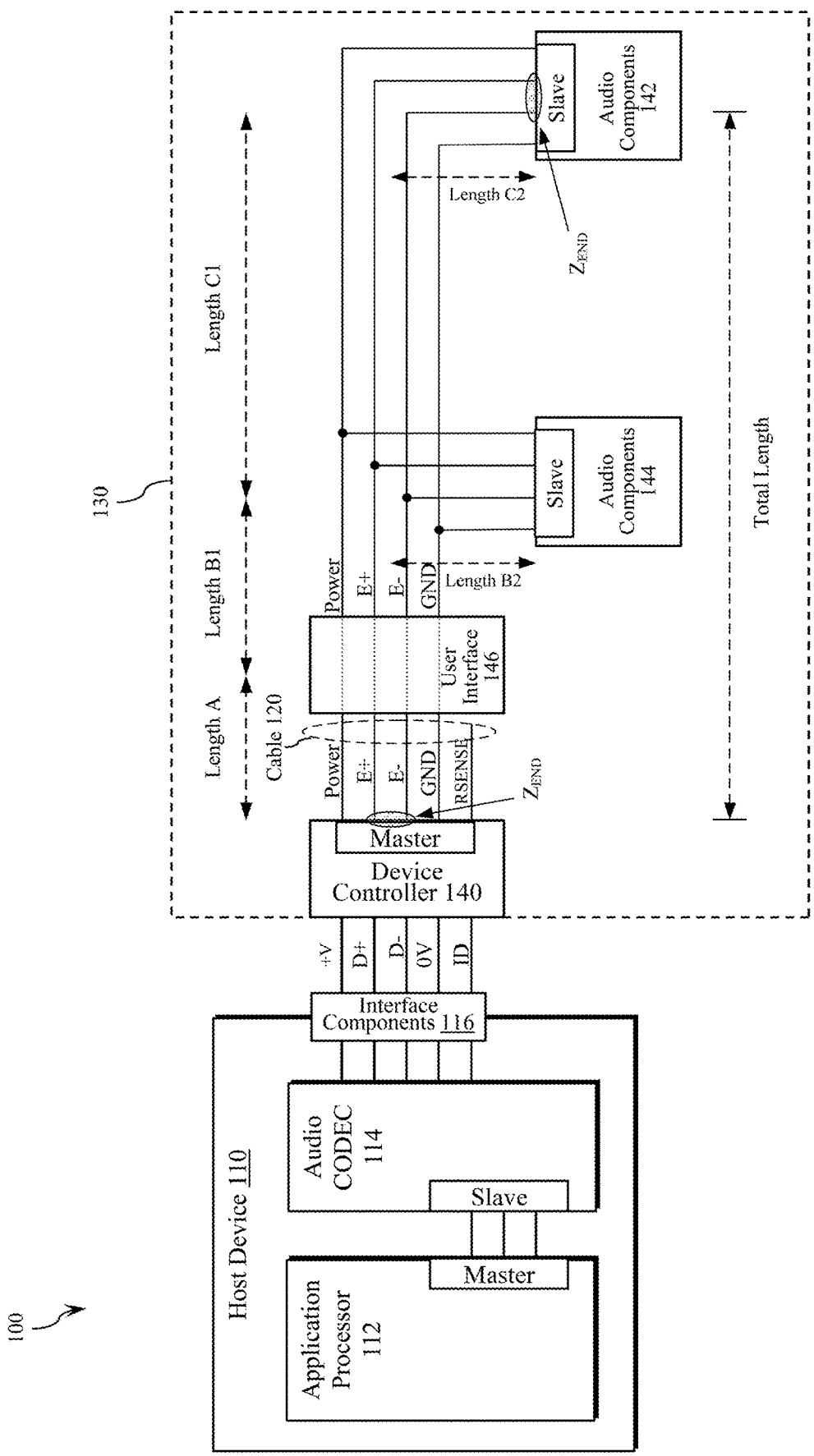
FIG. 1A is an exemplary a bus interface system in accordance one or more embodiments.

Referring to FIG. 1A, an exemplary audio system 100 will be described in accordance with one or more embodiments of the present disclosure. The system 100 includes a host device 110 and at least one connected device 130. The host device 110 may be any electronics device configured to send or receive audio data to or from the connected device 130 including, for example, a smart phone, a tablet computer, a laptop computer, an automobile voice interface, a voice conferencing system, an audio playback system or other electronics device. The connected device 130 may include one or more electronic devices configured to send, receive and/or process audio data and may include, for example, one or more microphones, loudspeakers or audio processing systems. Although the present embodiment is discussed with reference to audio communications, it will be appreciated that the systems and methods described herein may be implemented with other electronics devices and data types in accordance with the present disclosure.

In the illustrated embodiment, the host device 110 includes an application processor 112, an audio CODEC 114, and interface components 116. The application processor 112 controls digital audio data communications between the host device 110 and the connected device 130. The audio CODEC 114 provides audio input and/or output processing in accordance with requirements of the host device 110. The interface components 116 facilitate a physical connection between the host device 110 and the connected device 130 via a cable 120 and a compatible connector. In various embodiments, the interface components 116 may include a port for receiving the connector and a corresponding interface controller for implementing a communications protocol. In the embodiments described herein, a Universal Serial Bus (USB) connector and interface are described; however, it will be appreciated that other cables, connectors and protocols may be used in accordance with the embodiments described herein.

In one or more embodiments, the application processor 112 facilitates communications between the host device 110 and the connected device 130 using a multi-wire bus protocol including clock and data lines, such as defined by the SoundWire specification or the USB specification. The application processor 112 may communicate with the audio CODEC 114 in a master-slave relationship using an audio interface, such as SoundWire or another digital interface. The audio CODEC 114 facilitates communications between the application processor 112 and the interface components 116, translating the audio data between the two interface protocols. Audio data is transmitted between the interface components 116 and a device controller 140, which is configured to process data transmissions across the cable 120. The device controller 140 is further adapted to operate as a master device for communications with one or more slave devices, such as audio components 142 and audio components 144, across an interface bus of the connected device 130, and to facilitate other device functions, such as processing user inputs through user interface components 146. In one embodiment, the bus lines include a power bus (VBUS), a differential pair D+ and D− for data transmission, ground, and device ID. It will be appreciated by those skilled in the art that other bus line configurations may be used in accordance with the teachings of the present disclosure. Communications between various devices and components of system 100 may be facilitated in accordance with the digital data communications systems and methods disclosed herein.

Referring to FIG. 1B, an exemplary connected device 130 of FIG. 1A may be implemented as a USB headset 150, including a USB connector 152 for connecting to the interface components 116 of host device 110, a device controller housed in the connector 152, user interface 157 (such as buttons), and a wired data 158 bus connecting the device controller 152 with audio components 160 and 170. In one embodiment, the headset 150 is an adaptive noise cancellation (ANC) headset. Referring to FIG. 1C, an exemplary embodiment of the audio components 160 and 170 for use in an ANC headset is illustrated. The audio components 160/170 are implemented as slave devices on the data bus 158 of the headset 150. Each of the audio components 160/170 includes audio output circuitry 182 for receiving audio data from the slave component, and driving one or more speakers 186 to play the audio data for the user, and audio input circuitry 180 for receiving sensor data from one or more microphones 184, digitizing the received data and providing the digitized audio data to the slave for transmission to the master across the data bus 158.

Figure 2B:
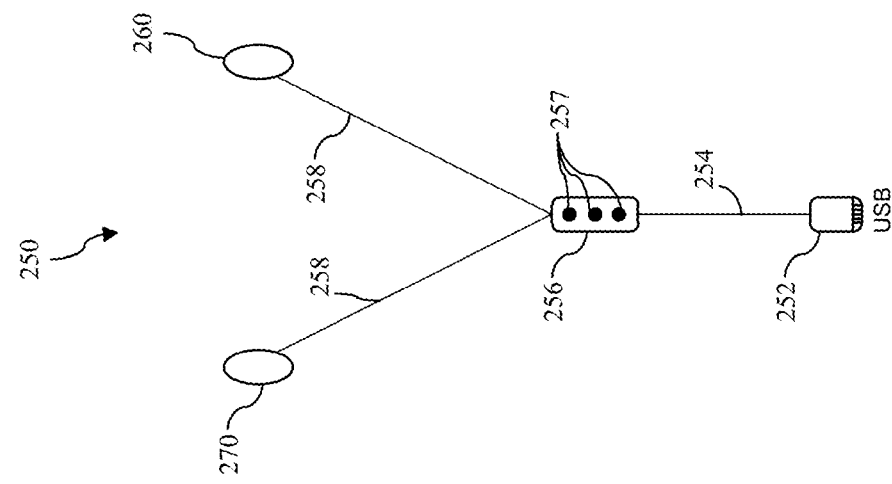
FIG. 2B illustrates an exemplary headset in accordance with one or more embodiments.
Figure 2A:
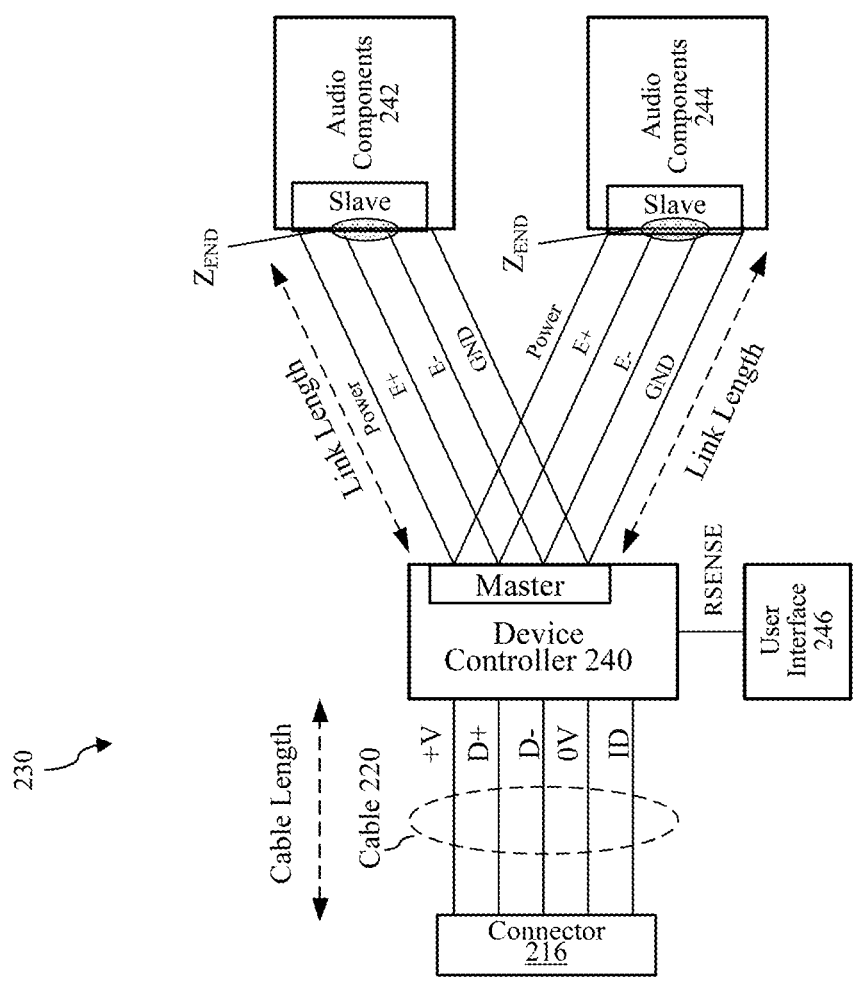
FIG. 2A is an exemplary of a bus interface system in accordance one or more embodiments.

Another embodiment of a connected device is illustrated in FIG. 2A. A connected device 230 includes a connector 216, a cable 220, a device controller 240, a user interface 246 and audio components 242 and 244. The connector 216 is adapted to couple with the interface components of a host device (such as interface components 116, of FIG. 1A). The cable 220 couples the connector 216 to the device controller 240 which provides an interface between the communications protocol used to communicate with the host device and the bus protocol of the connected device 230. The device controller 240 serves as a master of a communications bus coupling one or more slave devices, such as the audio components 242 and audio components 244. The user interface 246 is coupled to the device controller 240 to provide user controls (such as volume control or mute on a set of earphones).

Referring to FIG. 2B, an exemplary connected device 230 of FIG. 2A may be implemented as USB headset 250 (e.g., USB earphones), including a USB connector 252 for connecting to the interface components 116 of host device 110, a USB cable 254, a device controller 256, user interface 257 (such as buttons), and a wired data bus 258 connecting audio components 260 and 270 to the device controller 256.

The systems and methods of the present disclosure support long wired links, low power implementations and high bandwidth communications. In various embodiments, a low duty cycle is used for signals, which lowers the static power consumption associated with the terminated links. In various aspects of the present disclosure, a low duty cycle is accomplished on a per symbol basis (e.g., by using very short symbols) and/or by transmitting data packets very quickly then letting the bus idle for a short time period. One advantage of these approaches is that a low latency link is supported because the data packets can be transferred quickly after which the bus goes idle and consumes little or no power. In one or more embodiments, the higher data rate is supported by incorporating an internal phase locked loop (PLL) or DLL (delay locked loop) in each receiving device to generate a higher speed clock based on regularly transmitted synchronization symbols. One advantage of using a low duty cycle for the symbols is that it allows for low power consumption for medium transfer rates, because the static power consumption from the use of a terminated link is reduced due to the low duty cycle. In other words, a link capable of a high baud rate using a terminated transmission line may be utilized to obtain low power consumption for medium to low speed signaling because the power consumption of various embodiments disclosed herein scales linearly with the bandwidth used (the power consumption from the receiving PLL used to receive data will be constant but can be made to be a small fraction of the total power budget). Thus, the data link implementations disclosed herein are capable of low power consumption when using medium to low bandwidth and are still able to transfer large amounts of data with slightly higher power consumption. In both cases, the PLL clock frequency or DLL delay may be constant.

The present disclosure further supports a multi-drop bus topology by providing controls at intermediate nodes allowing high quality signals to be obtained even when there are impedance mismatches at intermediate nodes that would lead to poor signal integrity in conventional systems. In many conventional systems this is solved by avoiding terminations at the end of the transmission line and instead controlling the slew-rate of the signals, however, this leads to slower systems due to the limitation of the maximum slew-rate possible to avoid reflections. Various systems and methods disclosed herein do not suffer from this limitation.

The embodiments disclosed herein provide robust and reliable data links with minimal degradation on the signal integrity. In some embodiments, the transmitter may disable its own parallel termination resistor while transmitting to reduce power consumption further. In conventional systems, a change in impedance in a transmission line will result in reflections in the signals transmitted. This fact has resulted in conventional systems adhering to design constrains based on the notion that multiple components cannot easily be placed on intermediate nodes on a transmission line without severely distorting the transmitted signals.

In the present disclosure, however, it is recognized that if the change in impedance happens over a relatively short distance compared to the shortest wavelengths involved, there will be very little disturbance of the signals and a practical system may be implemented. As an example, an experimental system using a 50 Ohm transmission line included multiple intermediate nodes, each involving small stubs (1-2 cm in length), and this resulted in the change of the slew-rate from 4.7 ns to 4.8 ns (or about a 100 ps increase) and an amplitude reduction of about 6% for each node. Thus, even though the slew rate increased slightly and the amplitude was reduced a bit, the change in the signals was minimal, a good eye diagram was obtained, and a robust data transfer was achieved. Therefore, even though conventional theory has led to system requirements prohibiting any change of impedance along a transmission line to avoid reflections, these reflections can be controlled to be of such small magnitude that they are not detrimental to a practical functioning system as long as the length of these disturbances are much shorter than the wavelengths of the fastest signals involved.

The experimental system had a delay of 2 cm, which is equal to a transmission time of less than 0.1 ns in air, or much shorter than the rise time (5 ns). In this case the factor between the rise time and delay was more than 50 and led to minimal delays and disturbances in the system. If the delay had been 5 ns (150 cm of cable without shielding), the system the rise time and delay in the system would be comparable and the cable would appear open-ended. Thus, dimensioned as disclosed herein, one or more systems of the present disclosure will allow the transmission of very fast signals that are properly terminated at the end of a transmission line and simultaneously allow multiple components to reside on the same transmission line, thereby solving the problem of obtaining a multi-drop bus system that still allows high transmission speed. Furthermore, by timing the sequencing of the transmission of signals so that either a forward wave or backward wave is being controlled, it is possible to avoid problems with active transmitters residing on intermediate nodes on the transmission line that disturb travelling waves.

Figure 3:
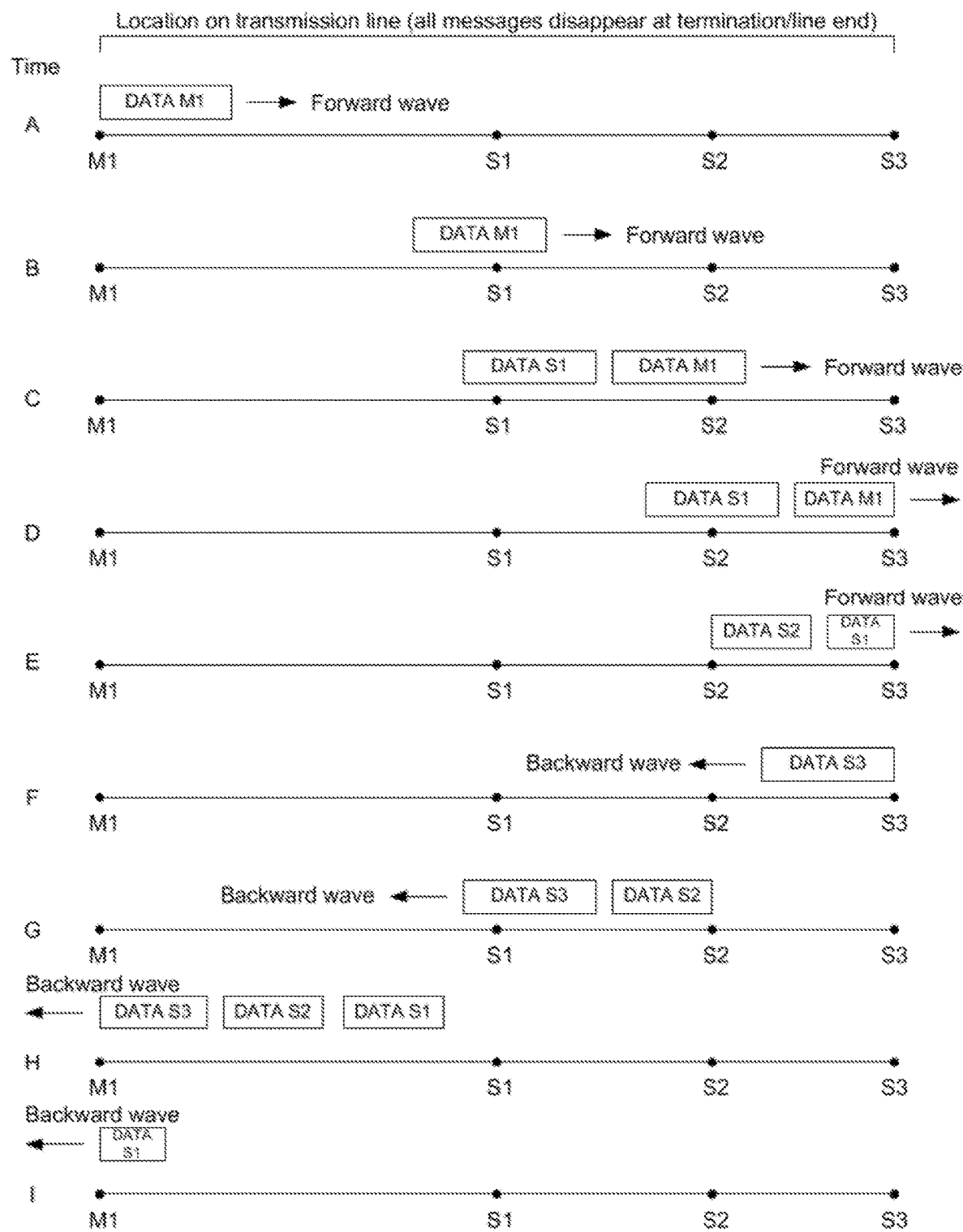
FIG. 3 illustrates an exemplary timing sequence in accordance with one or more embodiments.

An example of a timing sequence in accordance with one or more embodiments will now be described with reference to FIG. 3, which shows information travelling between a master device and 3 slave devices. By optimizing the timing related to the direction of the data transfer, higher bandwidth can be obtained. In various embodiments, all data packages will disappear once they reach the termination at the line ends. Assume a master M1 is located at the end of a transmission line with multiple slave devices (S1, S2 and S3) located on the same transmission line, with slave devices labeled number one, two, three, etc., as each slave device is further away from the master device.

When sending a forward travelling wave from the master, the master M1 sends a message first (Time A), immediately followed by slave device S1 when the forward wave has just passed slave device S1 (Time C), then slave device S2 sends its forward travelling wave message when the end of the message from slave device S1 has been completed (Time E). Slave device S3 sends a forward travelling wave message when the message from slave device S2 has been completed. When all forward travelling wave messages have been completed and absorbed by the termination at the other end of the transmission line, the last device residing on the transmission line (e.g., slave device S3 at Time F) begins to transmit a backward travelling wave towards the master M1. This backward travelling wave is followed by a transmission of a backward travelling wave from the second to last device (e.g., slave device S2 at Time G) residing on the transmission line, just after the message from the last device has passed, and so on. When all backward travelling wave messages have been completed and absorbed by the termination at the master device, the master M1 would again begin to transmit messages using a forward travelling wave as previously described.

In some embodiments, two devices may be transmitting messages simultaneously if these devices are located the opposite ends of the transmission line and the influence of its own transmitting wave is subtracted from the measured wave (the superposition of the forward and backward travelling wave). In some embodiments, this may also be performed even with devices located on intermediate points of the transmission line, however in some embodiments a device located on intermediate points should generally not transmit at the same time as receiving because this could lead to reflections of the forward or backward travelling wave.

In various embodiments, a communications bus for use with audio devices, such as audio headsets, includes a multi-drop bus using differential impedance matched signaling to enable high bandwidth and low power consumption. The bus has high control and audio bandwidth and supports links up to more than 10 meters. In one or more embodiments, the total bus link length is two meters or less. Referring to FIG. 1A, the link length is the length of the wires between the two termination endpoints, $Z_{END}$, and includes the length of the cable 120 from the device controller 140, which may be integrated into the connector, to the user interface components 146 (Length A), the length of the wires from the user interface components 146 to the intermediate nodes (Length B1 & Length B2), and the length of the wires from the intermediate nodes to the termination end point (Length C1 and Length C2). In one embodiment, the links have a total length of 0-200 cm from termination endpoints, including the following ranges: Length A, 0-80 cm; Length B, 0-60 cm; and Length C, 0-60 cm. In one embodiment, the stubs B2 and C2 should be kept as short as possible to minimize the impact on the signal integrity.

Referring to FIG. 2A, in one embodiment the length of the USB cable is from 0-200 cm and the link length between each termination end point and the device controller 240 is from 0-100 cm each. In the illustrated embodiments, the link between the terminal end of the headset and the farthest speaker or microphone is less than 200 cm, but other distances may be used.

In various embodiments, the link supports standard clock rates, such as 12.288 MHz and 19.200 MHz, thereby providing compatibility with standard telecommunication and audio systems. In one embodiment, a linked distance of 10 meters is supported in the 12.288 MHz mode of operation by increasing the turn-around delay when switching signaling direction.

In various embodiments, it is desirable that the lock-in range of the PLL be narrow, and to maintain a constant number of bits between each sync symbol. Further, in various embodiments it is desirable to maintain 48 kHz compatibility with multiple clock systems. The present disclosure provides an initial synchronization between slave and master devices that is simple and robust and, in various embodiments, uses a constant frame size. The use of a constant frame size is in contrast to SoundWire and similar protocols, which enable multiple frame sizes to ensure compatibility with multiple clock systems. In one or more embodiments, the clock frequency is signaled using a dedicated bit within the frame, whose position will represent the clock frequency used.

Exemplary operational modes in accordance with one or more embodiments of the present disclosure are illustrated in the table, below:

| Mode name | Telecom | USB | Audio | Unit |
|---|---|---|---|---|
| Main clock | 9.600 | 12.000 | 12.288 | MHz |
| Bus length (min) | 0 | 0 | 0 | m |
| Bus length (max) | 2.0 | 2.1 | 2.1 | m |
| Bandwidth master to slave | 51.200 | 48.000 | 49.152 | Mbaud |
| Bandwidth slave to master | 51.200 | 48.000 | 49.152 | Mbaud |
| Control bandwidth | 6.400 | 6.000 | 6.144 | Mbaud |
| Control words | 32 | 32 | 32 | Bits |
| Control update | 200 | 187.5 | 192 | kHz |
| Bitrate link | 134.400 | 126.000 | 129.024 | MHz |
| PLL, typical | 268.800 | 252.000 | 258.048 | MHz |
| PLL reference frequency | 3200 | 3000 | 3072 | kHz |
| PLL power consumption, approximately | 250 | 230 | 240 | µW |
| Spacing between sync symbols | 42 | 42 | 42 | Bits |
| Data latency master or slave (one row) | 313 | 333 | 326 | ns |

The systems and methods disclosed herein provide additional advantages including energy efficient design, solving the problem of sync symbols interfering with frame size, efficient bandwidth utilization by merging sync columns with commands, simple clocking scheme, single clock source, enabling fine-tuning of delays for optimal signal integrity, supports 12.288, 19.200 and 12.000 MHz systems, wideband PLL tracking not being required, a constant frame size may be used with a varying data format to support multiple clock systems, and accurate measurement of slave delay using micro-stepping of sample interval for optimization of the eye diagram while receiving data. In various embodiments, the multi-drop bus may be used for multiple clock systems, such as telecom, USB, audio, and audio long modes of operation, for example, while maintaining a constant frame length.

Clock Support

As previously discussed, one problem encountered with conventional bus topologies relates to support for different clock frequencies, including multipliers or dividers that are needed to get the desired base frequencies. As an example, 48 kHz can be obtained by dividing 19.200 MHz by 400 (4×5×5) or 12.288 MHz by 256 (4×4×4×4). In various embodiments disclosed herein, commands transmitted on the bus do not impede audio flow. In one embodiment, the commands are issued with the same cadence as the audio data (or a submultiple thereof). In some embodiments, there is a constraint of PLL or DLL clock synchronization to embed the clock in the data line and thereby save wires and power consumption. By using differential signaling, electromagnetic interference (EMI) can be constrained.

In one embodiment, a solution is provided that includes adding extra bits to give space for synchronization and commands within a communications frame. The system can support various clock frequencies, and the frame structure may be optimized with respect to bandwidth utilization given constraints of a long bus diameter. The structure of this embodiment is determinate and simple to decode, and does not require complicated analog circuits to determine the exact clock frequency, e.g., the number of clock pulses between each sync symbol frame stays constant.

Existing systems, such as SoundWire, contain a variety of defined frame formats—e.g., 8 column sizes and 19 possible row values for a total of 152 combinations. One challenge is to design a system that supports both 12.288 MHz and 19.200 MHz operation because each has different multipliers (19200/48=400 and 12288/48=256), without needing special analog systems. In various embodiments described herein, a single frame size may be used that allows support for both 12.288 and 19.200 and even 12.000 MHz systems.

The PLL and clocking solutions disclosed herein solve various problems associated with conventional systems. When there is an unterminated transmission line there are reflections, which can disturb signal quality. One solution is to slow down data transmissions. However, for many systems high speed transmission is desired and, therefore, a terminated line is preferred to eliminate unwanted reflections. By using a high clock speed, it is possible to reduce the static power consumption per transmitted bit and thereby get lower power consumption for medium speed links.

When there are only two devices, synchronization between devices is simplified because there is no cross traffic. With multiple devices, there is a possibility that a slave device will lose lock on the master device. One solution is to restart the bus, but that is not desirable for many implementations because the system will lose audio for a period of time. Various embodiments of the present disclosure address the problem of a slave device that has lost synchronization by resolving the clock synchronization while other devices on the bus continue operating.

Figure 4:
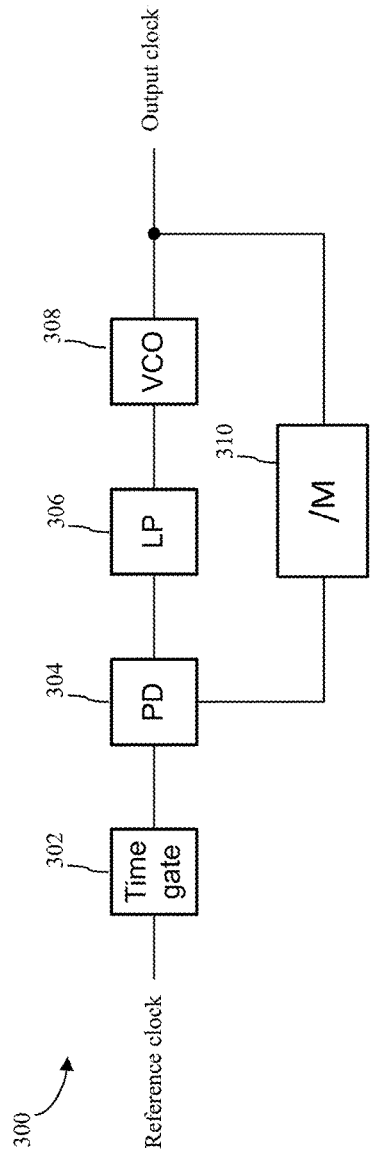
FIG. 4 illustrates an exemplary time gated phase locked-loop (PLL) in accordance with one or more embodiments.

Referring to FIG. 4, an exemplary phase locked loop (PLL) 300, which may be included in the device controller 140 of FIG. 1A and device controller 240 of FIG. 2A, and the slave devices 142 and 144 of FIG. 1A and 242 and 244 of FIG. 2A, will now be described. The PLL 300 allows the circuit to maintain lock, even in the presence of signals from multiple slave devices that are offset from the main synchronization signal.

The PLL 300 (or DLL) generates an output clock signal having a phase and frequency relative to the phase and frequency of an input reference clock. During operation, the reference clock signal, through time gate 302, and a feedback signal from a divider 310 are input into a phase detector 304. The phase detector 304 compares the phases and frequencies of the input reference clock signal and the feedback signal, and outputs a control signal to adjust the feedback signal accordingly to have a phase and frequency synchronized with the phase and frequency of the reference clock signal. The phase detector 304 aligns the phases of the rising (or falling) edges of the reference clock signal and the feedback signal. The phase detector 304 output is provided to a loop filter 306 to adjust the voltage and frequency of a voltage-controlled oscillator (VCO) 308. The signal output from the VCO 308 is passed through divider 310 to produce the feedback signal. The output clock signal is provided to various system components as described herein. In the illustrated embodiment, the divider is configured to be a multiple of the frame size of 144 bits, but other integer values (e.g., M=42) could be chosen. Using M=4 gives 4 time slots directly, or 8 time slots using both phases of the clock for the data capture of bus signals. Using M=8 give 8 time slots directly or 16 time slots using both phases, which provides a simple solution with high resolution.

In various embodiments, the time gate 302 is enabled all the time during initial startup after which it is only enabled during the reception of a reference sync pulse from the master device. This enables the circuit to be locked to the master even if multiple slave devices are also signaling on the bus and these are offset in time with the master. Furthermore, if the PLL/DLL loses lock with master synchronization, the device will disable output drivers to avoid bus collision and re-enable a wide search for the sync pulses. In some embodiments, the phase detector may be eliminated, if the time gate is corrected in time and has a sufficiently narrow window. This may be used to reduce timing jitter (the time gate will still be controlled by the output from the VCO through a divider).

Exemplary clock dividing solutions for use with embodiments of the present disclosure will now be described. In one embodiment, illustrated in FIGS. 5A and 5B, a clock solution is an implementation of a frequency locked loop (FLL) 400 that generates three synchronized clock signals, an audio clock 402 used for audio input and output processing, no subtraction is needed due to the automatic wrap-around. In some embodiments, a delta-sigma converter may perform the integration instead of the phase-adder thereby eliminating spurs resulting from the fractional division. This may be used for lower EMI of the output clock signal by spreading the output spectrum.

Exemplary clock solutions for various embodiments of the present disclosure are illustrated in the table, below. As used herein, the term "EarLink" refers to the audio bus systems and methods of the present disclosure.

| Parameter | Solution 1 | Solution 2 | Solution 3 | Solution 4 |
| --- | --- | --- | --- | --- |
| Main clock [MHz] | 1548.288 | 1548.288 | 1536.000 | 1536.000 |
| Audio clock 12.288 MHz | Divide EarLink clock by 21 | Divide EarLink clock by 21 | Divide main clock by 125 | Divide EarLink clock by 21 |
| USB clock 12.000 MHz | Fractional divide of main clock, factor = 63 × 256/125 | Use audio clock times 125/128 (extra PLL) | Divide main clock by 128 | Divide main clock by 128 |
| EarLink 258.048 MHz | Divide main clock by 6 | Divide main clock by 6 | Multiply audio clock times 21 (extra PLL) | Fractional divide of main, factor 3 × 125/63 |
| Advantages | Single VCO no new analog IP | No fractional divider needed | Cleanest USB clock, simple extra PLL | Single VCO, no new analog IP, lower EMI |
| Disadvantages | Fractional divider needs to run at high speed, higher jitter USB | Extra PLL needed, higher jitter USB | Extra PLL needed, higher jitter EarLink | Fractional divider needs to run at high speed, higher jitter EarLink |
| Jitter (audio) | Low | Low | Add 100 Ps (approx.) | Add 94 Ps |
| Jitter (USB) | Extra 93 ps | Extra 100 ps (approx.) | Low | Low |
| Jitter (EarLink) | Low | Low | Add 100 Ps (approx.) | Add 94 Ps |
| Silicon area | Lowest | Low | Low | Lowest |
| Power consumption | Lowest | Low | Low | Lowest |

USB clock 404 used for USB communications between the host device and the connected device, and a data bus and DSP clock 406 for use in the low latency data bus of the present disclosure. The sync pulse present in the USB protocol may be used as a timing reference.

Figure 5A:
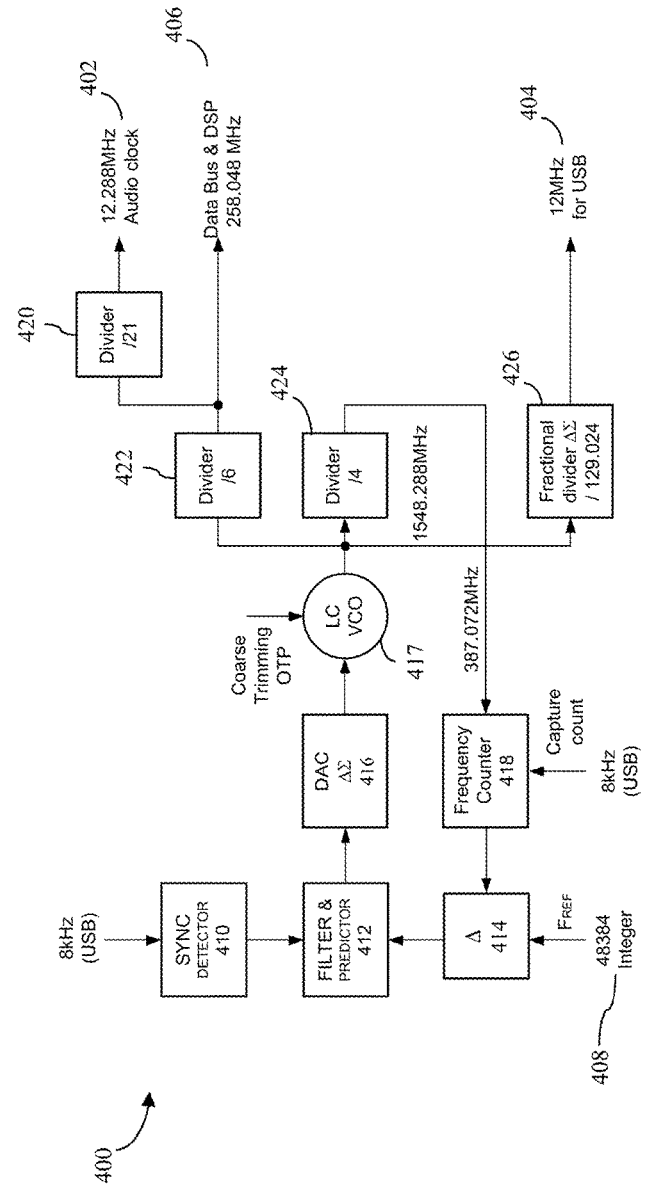

In the illustrated embodiment, a sync detector 410 is coupled to the input of the FLL 400. The sync detector 410 determines whether the clock signal is in sync with the system clock to allow for proper bus communications. If a sync symbol arrives out of sync, the sync detector 410 will cause the FLL 400 to modify the clock cycle to bring it into sync with the master clock. The FLL 400 may be implemented as illustrated including a digital filter and predictor 412, a digital-to-analog converter (DAC) 414, such as a Delta-Sigma DAC, a voltage controlled oscillator (VCO) 417, divider 424, frequency counter 418 and subtractor block 414 to compare the results with the reference frequency 408. Another aspect of the illustrated embodiment is the use of reference frequency integer, 48384 (see reference 408), which may be used to cause the FLL 400 to produce the desired divided frequencies using fractional divider 420, fractional divider 422, and fractional divider 426. An embodiment of a fractional divider 430 is illustrated in FIG. 5B that may be used to divide a clock signal by a fractional value. The fractional divider 430 is implemented using a phase adder 432 and divider 434, where a certain phase value is added or subtracted for each clock cycle and when the phase exceeds a certain maximum value, this phase value is subtracted or added to the sum. If a two-complement adder is used, the phase value may be taken as $2^N$ steps and An exemplary embodiment of a second clock solution is illustrated in FIGS. 6A and 6B. The second clock solution is an implementation of a frequency locked loop (FLL) 500 that generates three synchronized clock signals, an audio clock 502 used for audio input and output processing, USB clock 504 used for USB communications between the host device and the connected device, and a data bus and DSP clock 506 for use in the low latency data bus of the present disclosure. The FLL 500 includes a sync detector 510, filter and predictor 512, Delta-Sigma DAC 516, VCO 517, divider 524, frequency counter 518 and subtractor block 514, which may be implemented in a similar fashion to corresponding components of FIGS. 5A and 5B, except as described herein. The FLL 400 produces the desired divided frequencies using fractional divider 520, fractional divider 522, and PLL 540, which outputs a frequency at 125/128 of the audio clock frequency. An embodiment of the PLL 540 is illustrated in FIG. 6B and includes a 1/128 reference input from the output of divider 520, a phase detector 544, loop filter 546, VCO 548 and 1/125 divider 550.

Figure 7:
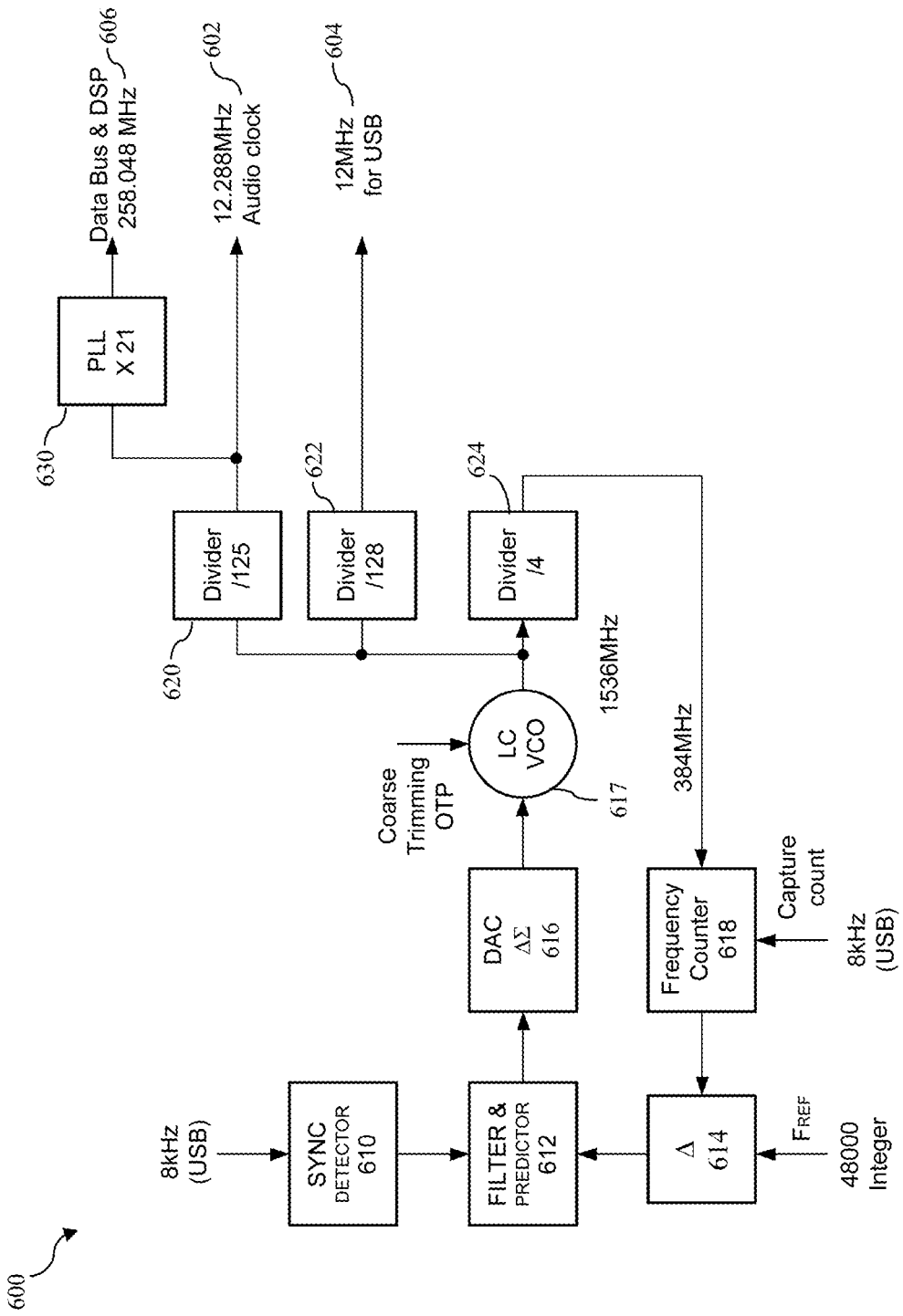
FIG. 7 illustrates an exemplary clock solution in accordance with one or more embodiments.

An exemplary embodiment of a third clock solution is illustrated in FIG. 7. The third clock solution is an implementation of a frequency locked loop (FLL) 600 that generates three synchronized clock signals, an audio clock 602 used for audio input and output processing, USB clock 604 used for USB communications between the host device and the connected device, and a data bus and DSP clock 606 for use in the low latency data bus of the present disclosure. The FLL 600 includes a sync detector 610, filter and predictor 612, Delta-Sigma DAC 616, VCO 617, divider 624, frequency counter 618 and subtractor block 614, which may be implemented in a similar fashion to corresponding components of FIGS. 5A and 5B and FIG. 6, except as described herein. The FLL 600 produces the desired divided frequencies using fractional divider 620, fractional divider 622, and PLL 630, which outputs a frequency at 21 times the audio clock frequency.

Figures 8A, 8B:
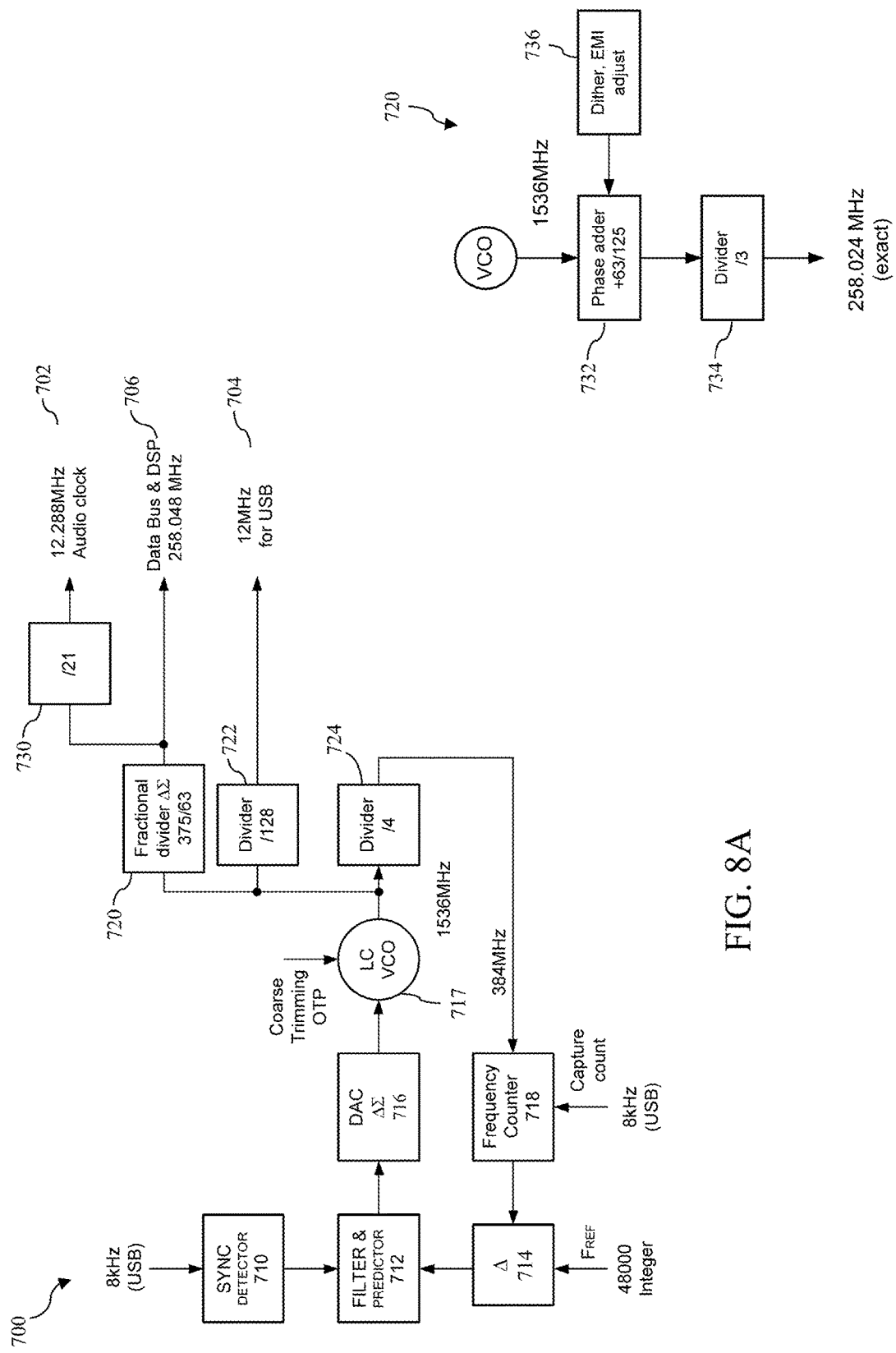
FIGS. 8A and 8B illustrate an exemplary clock solution in accordance with one or more embodiments.

An exemplary embodiment of a fourth clock solution is illustrated in FIGS. 8A and 8B. The fourth clock solution is an implementation of a frequency locked loop (FLL) 700 that generates three synchronized clock signals, an audio clock signal 702 at 12.288 MHz used for audio input and output processing, a USB clock signal 704 at 12 MHz used for USB communications between the host device and the connected device, and a data bus and DSP clock signal 706 at 258.048 MHz for use in the low latency data bus of the present disclosure. The FLL 700 includes a sync detector 710, filter and predictor 712, Delta-Sigma DAC 716, VCO 717, divider 724, frequency counter 718 and subtractor block 714, which may be implemented in a similar fashion to corresponding components of FIGS. 5-7, except as described herein. The FLL 700 produces the desired divided frequencies using fractional divider 720, fractional divider 722, and fractional divider 740, which outputs a frequency at 21× of the audio clock signal 702. An embodiment of a fractional divider 720 is illustrated in FIG. 8B that may be used to generate the data bus and DSP clock signal 706. The fractional divider 720 is implemented using a phase adder 732 and divider 734, where a certain phase value is added or subtracted for each clock cycle and when the phase exceeds a certain maximum value, this phase value is subtracted or added to the sum. In some cases, dither generator 736 provides dithering of the phase adder to not only divide the clock by a fractional value but further add a dither value to the intermediate phase value. This will increase the jitter of the clock but can be used to reduce the EMI of the system clock by controlling the amount of dither added. The dither generator 736 may be implemented using a digital pseudorandom generator or other digital circuit generating random numbers. If the pseudorandom generator adds an average value to the phase adder sequence that is different from zero, this should be taken into account when updating the phase adder.

Frame Structure

In accordance with various embodiments of the present disclosure, a single frame structure may be used across multiple supported frequencies. Exemplary frame structures for use with the disclosed embodiments will now be described.

Referring to the embodiment of FIG. 9A, a frame structure includes frames having a constant size of 42 bits, with a synchronization pattern repeating with a frequency of once per frame. In one embodiment, the number of command bits per message is 32 bits, and the message synchronization bit repeats once every 48 kHz. Each frame comprises four subframes, and each subframe has the same structure and looks the same with respect to synchronization. An exemplary organization of command bits is illustrated below, where SCMD is start of command, S48 is a 48 kHz beacon, RES is a reserved field, OP2-OP0 is a three bit opcode, DEV3-0 is a 4 bit device number, DAT is data to be transferred as part of the command, PAR is a parity bit for security and ACK is an acknowledgment bit:

| SCMD | S48 | RES | OP2 | OP1 | OP0 | DEV3-0 | DAT | PAR | ACK |

The bit S is equal to one at the start of the first subframe for every 48 kHz time tick or every $64^{th}$ frame or 256 subframes (for 9.600 MHz system, for every 24 kHz time tick or 512 subframes). The S bit may be used to find the start of a frame and to synchronize multiple sound sources to 48 kHz (e.g., the start of the first frame should be the sample event).

Details of the data organization are further illustrated in FIG. 9A. A zero to one transition is used by the PLL in a slave device to synchronize to the master, followed by command bits, CMD. Next, 16 bits of audio may be transferred from the master device to the slave device, followed by a double time-slot delay (to allow a change in the signal direction) during handover from the master device to the slave device (including a read, R, command). Next, 16 bits of audio may be transferred from the slave device to the master device followed by a two-way time-slot delay.

Embodiments for 9.600 MHz, 12.000 MHz and 16.000 MHz systems are illustrated in FIGS. 9B and 9C. These formats will enable support for telecom clocks and can vary the utilized bandwidth between master and slave, from about ⅓ to ⅔ of the bandwidth used by the master or by the slave. These formats have the advantage that the number of bits per row is 10 or slightly more, for more efficient transfers at clock frequencies related to 19.200 MHz. This frequency or 38.40 MHz=2*19.20 MHz is often used in telecom applications such as mobile phone and handheld devices.

Referring to FIGS. 9D and 9E additional frame structures will be described. In accordance with various embodiments, the same number of bits is present in each frame between each synchronization pulse. However, the number of bits can be varied, for example, by changing the amount of bandwidth used for commands. The frame structure can also be varied in the number of rows and columns and still maintain the same number of bits. Both FIGS. 9D and 9E, for example, include the same number of bits per frame. By dividing by a larger number of bits per frame (e.g., 144 bits) that can be broken into various factors, the frame organization can be changed without changing the PLL multiplication factor, at the expense of higher jitter in the receive eye opening due to the higher bandwidth.

An organization of an exemplary message field is illustrated below:

| Opcode | MM3 | MM2 | MM1 | MM0 | Instruction functionality |
|---|---|---|---|---|---|
| NOP | 0 | 0 | 0 | 0 | Do nothing |
| RD | 0 | 0 | 0 | 1 | Read register from device |
| RDINC | 0 | 0 | 1 | 0 | Read register and increment address register |
| WR | 0 | 0 | 1 | 1 | Write register in device |
| WRINC | 0 | 1 | 0 | 0 | Write register and increment address register |
| DELAY | 0 | 1 | 0 | Device loop delay | This will use a selective device response to identify devices, multiple reads from multiple devices |

-continued

| Opcode | MM3 | MM2 | MM1 | MM0 | | Instruction functionality |
|---|---|---|---|---|---|---|
| SETDEV | 0 | 1 | 1 | | Set device address | After identifying a device, this command will assign a new device number to the device (0-7, include the transmit delay value) |
| SEL | 0 | 1 | 1 | | Selective response | Delay response from a single device |
| DEVAD | 1 | DEV2 | DEV1 | DEV0 | | Select device and update the I/O address register |

It will be appreciated that while many of the commands may be conventional (do nothing, read and write of registers), a DELAY command may be used to find the delay between devices attached to the transmission line for optimal timing. This can be accomplished by the master first charging the line to a certain value, then keeping this value with a bus holder or utilizing a floating bus, after which the main driver is released and after which any device attached to the bus can toggle this value. The device located closest to the master will first affect the toggling of the bus line, which may be reliably measured using a counter clocked at a high speed that detects the timing event or using multiple delay circuits. During the measurement the bus will not be terminated in order to not affect the timing. The measurement can take place inside the master (to optimize slave transmit timing) or inside a slave device (to optimize slave-to-slave communication timing).

FIG. 9F illustrates exemplary protocol symbols in accordance with various embodiments. Another set of exemplary commands are further illustrated in the table, below:

| Command value | | | Command | |
|---|---|---|---|---|
| OP2 | OP1 | OP0 | name | Description |
| 0 | 0 | 0 | Read | The current address value is used for a read operation, data returned and the internal address is incremented afterwards. |
| 0 | 0 | 1 | Write | The current address value is used for a write operation, data is written and the internal address is incremented afterwards. |
| 0 | 1 | 0 | Device address register | The data field will set the device address register to prepare for read or write operations |
| 0 | 1 | 1 | Beacon | Beacon signal for multisource and frame synchronization. Repeated at a frequency of 8 kHz. Start of next frame is the synchronization point. |
| 1 | 0 | 0 | Device loop delay | This will use a selective device response to identify devices, multiple reads from multiple devices |
| 1 | 0 | 1 | Set device address | After identifying a device, this command will assign a new device number to the device (0-7, including a delay value) |
| 1 | 1 | 0 | Selective response | Delay response from a single device |
| 1 | 1 | 1 | Reserved | Reserved |

An embodiment of the "register read operation" will now be described. In order to perform a register read operation, the following sequence may be performed: (i) write the correct address value using the address write operation, and (ii) perform a register read operation (the data field will contain the read value). If a range of registers needs to be read, this can be accomplished without updating the address register between every read operation. This is possible because the address counter may be incremented by one for every read operation.

An embodiment of the "register write operation" will now be described. In order to perform a register write operation, the following sequence may be performed: (i) write the correct address value using the address write operation, and (ii) perform a register write operation (the data field will contain the read value). If a range of registers is to be written, this can be accomplished without updating the address register between every write operation. This is possible because the address counter may be incremented by one for every write operation.

An embodiment of the "address register write operation" will now be described. Register accesses are controlled by the address register. Before performing a register operation, the value of the address register is first defined. This happens with the address register write operation. The address register points to the current active register in the addressed slave device. Subsequent access (either read or write operation) may increment the address register. This enables faster access to multiple registers. In various embodiments, there is only a single register controlling both the read and write operation and any read or write operation may increment the value of this address register. The increment takes place after the value of the address register has first been used once in a read or write operation. The current value of the address register cannot be read back using the commands shown in the table.

An embodiment of a "beacon" command will now be described. This command is being sent out by the master with a repetition period of 48 kHz. It is used by slaves to synchronize audio timing to the start of a frame so that all audio sources are synchronized. All slaves with an address different from zero will also respond with a single logical one in the assigned time slot for the device.

An embodiment of a "device loop delay" command will now be described. This command measures the turn-around delay from a slave device to the master by measuring a transition initiated by a slave device and travelling to the master. In the present embodiment a mechanism for measuring the two-path delay is provided. An embodiment of a method 800 for delay measurement will now be described with reference to FIG. 10A. First, the master sends a command to a device to indicate that delay measurement will start (step 802). Next, the termination are disabled at both ends (step 804) and the transmission line is charged with a known symbol (step 806). A known device responds by discharging the transmission line in step 808. The delay is measured from the charging event to the discharge event in step 810. In step 812, the terminations are enabled at both ends of the transmission line.

In one implementation, the master sends out the device loop delay command, followed by the device number to be interrogated. Next, the master sends out a device ID value in the data field, and any device with a device ID equal to or higher than the device ID will respond to the command. If the device ID is equal to the data field, an internal flag ("device_update_ready") will be set, and if the device ID is not equal to the data field the internal flag will be reset. Next, the bus is brought to a known state by the master (i.e. the bus is initialized to a known logical value, zero). The master will maintain this state with weak bus holders or using a floating bus and disable its transmitter after driving the bus to a known state and ensure terminations at both ends are disabled during the measurement.

A slave device can then drive this state to a different value using the strong internal driver inside the slave device. In one embodiment, the slave devices output the following sequence where Z is a disabled driver, and 1 is driving a high signal—ZZZZ-11-ZZZZ—and the double one will ensure a correct reading of ones under all delay conditions. When the master receiver receives the transition signal from one or more slaves, it will know the delay from the timing. The timing for this event will be used to find the two-way delay to the nearest device and to optimize the eye diagram of the receiver by controlling the transmit or receive timing delay. The delay value may be measured based on an internal oversampled clock inside the master device or use of a delay line or delayed sample inside the master device. In some cases, where is a significant amount of noise or clock jitter present on the bus, it may be necessary to repeat this procedure multiple times in order to get a good delay reading. This may also involve the reading of the returned value from multiple timeslots and obtained with a fine resolution, e.g. 2 ns, and then averaged over multiple read values, e.g. 64. If the returned value could happen in any position from 0-36 ns, we would need a total of 19 values returned from a slave device to accurately determine the delay in all cases, and in each case we might have to perform multiple (e.g. 64) reading to get a good average value returned.

The charge left on the bus will be absorbed by the master when it sets the bus to a known value and thereby empty the transmission line of any previous information. If multiple slaves are present, they will be eliminated one at a time using their device ID (16 bits constant). The slave closest to the master will correspond to the obtained delay value. In other words, during measurement of device delays or enumeration of devices attached to the bus, the first device attached to the transmission line (typically the master) and the last device attached to the bus (typically a slave device) will both disable their driver during this procedure to enable a floating bus, that maintains the state by the intrinsic charge inside the transmission line.

In various embodiments, only devices with number DEV and a device ID equal to or higher than the data field value will activate the output. A binary search can then be used to find the device with the highest address current connected to the bus, eliminate this device from the search by assigning it a different device ID, continue to find the address of the second highest device attached to the bus, and so on. In one embodiment, all devices will turn off normal data traffic in the last row of a frame when the delay command is used to ensure they will not disturb the measurement. In some embodiments, a slave device may be programmed to use a specific delay that corresponds to a certain geometrical configuration, thereby omitting the need for finding the physical delay before interacting with this component and omitting the need for inclusion of non-volatile memory or other means to convey the delay value to the internal circuitry.

Referring to FIG. 10B, a method 850 for enumeration of attached devices that contain an internal device number, but not a device number suited for the bus, is illustrated. In step 852, the master sends a command to indicate that enumeration will start. Terminations at both ends are disabled in step 854, and the master proceeds to charge the transmission line with a known symbol in step 856. An unknown device on the bus responds by discharging the transmission line if a bit from the device number is high (step 858). After a known delay, all devices with low bit in the device number abort (step 860). If more than one device remains (step 862), then the next device bit is checked and device arbitration continues in step 864. If only a single device remains, then the device is assigned an address in step 866.

An embodiment of a "set device address" command will now be described. After power-on reset, slave devices are assigned the device address value zero. When executing this command, the addressed device will get a new address (0-7). Notice address 7 (111) is included for broadcast. In one embodiment, only a device with the device_update_ready set will be updated.

Duplex Operation

Figure 11A:
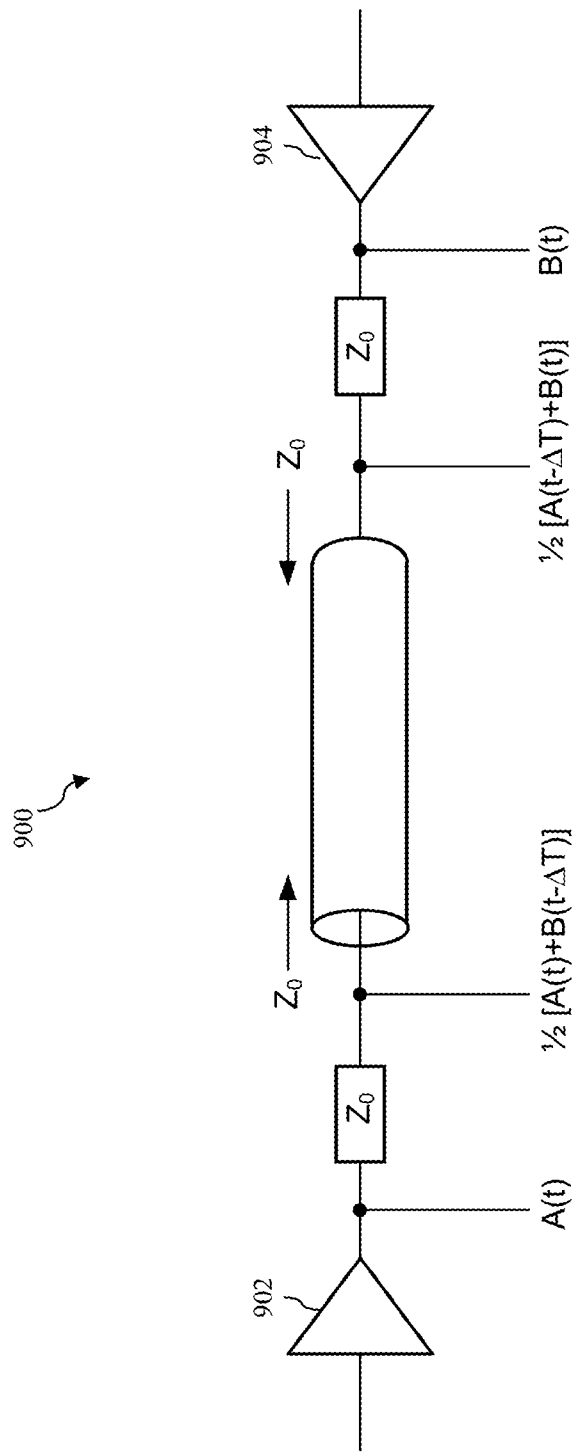
FIG. 11A illustrates an exemplary duplex communications arrangement in accordance with one or more embodiments.

An embodiment of duplex operation will now be described with reference to FIG. 11A. In various embodiments, the bus 900 may work in either simplex or duplex mode of operation. In this arrangement, the I/O ports may be configured to both transmit and receive signals simultaneously through design of the output driver, which may be used to enable a bus length exceeding 25 meters, such as may be used for home audio systems.

In this embodiment, the transient response at the forward and backward travelling waves is used to assess what is happening when two simultaneous drivers are present. The voltage at any point is determined by the sum of the forward and the backward travelling wave. Therefore, we can measure the point at any node and subtract the influence from the two drivers rather simply, by taking into account the impedance of the output driver and the impedance of the transmission line.

For simplicity, let us first assess the situation with only two drivers 902 and 904 located at each end of a transmission line. Let us also assume the drivers 902 and 904 use a series termination with a value equal to the transmission line impedance, $Z_0$, to properly terminate the link. This means both the forward and backward travelling waves will be half of the initial driver voltage. Since the voltage at any point can be found from the sum of the forward and backward travelling waves, we can find the correct received voltage by subtracting half of the driver voltage from the measured voltage. This can be done for the differential case, by simply adding half the inverted transmitted voltage to the received signal, e.g., by swapping and adding half the differential transmit voltages using a capacitor. In this approach, a two-way delay during turn-around of transmitter direction is not needed for many configurations and much longer links (e.g., 25 meters) are possible with continuous operation and no breaks in the data stream due to the absence of turn-around delays and full duplex operation at extremely high speeds are possible (0.1-5 Gbps). Notice, this configuration does not require any timing adjustments as long as long as the operation is confined to one node at each line end and each node send out synchronization pulses on a regular basis.

Multiple Slaves

Various embodiments of multiple slaves will now be described. While duplex operation is relatively simple when having a single master and a single slave device, the situation becomes more complicated for multiple slave devices. One issue is that intermediary nodes will reflect waves from either direction, because they do not present a termination (in order to enable a multi-drop connection). Therefore, traditional duplex operation may not be practical for certain implementations. It is however, possible to increase throughput with proper timing of the signals. In various embodiments, signals will come from master to slave devices first. Other slave devices may need to wait until the forward wave from the master has passed these devices before they can begin to transmit. Therefore, an exemplary timing diagram to handle this situation and without needing any handover delays would be the following transmit sequence: {M, S1, S2, S3, S4, S5} and then repeat this pattern in reverse {S5, S4, S3, S2, S1, M} when changing direction, where M represents the Master and S1 is the slave device closest to the Master and S5 is the slave device furthest away from the Master. In other words, the devices attached to the bus shall either transmit a sequence for a forward or backward wave and that way avoid problems with reflections from intermediate points on the transmission line. The timing delays of devices attached to the bus shall be determined before attempting this scheme.

Figure 11B:
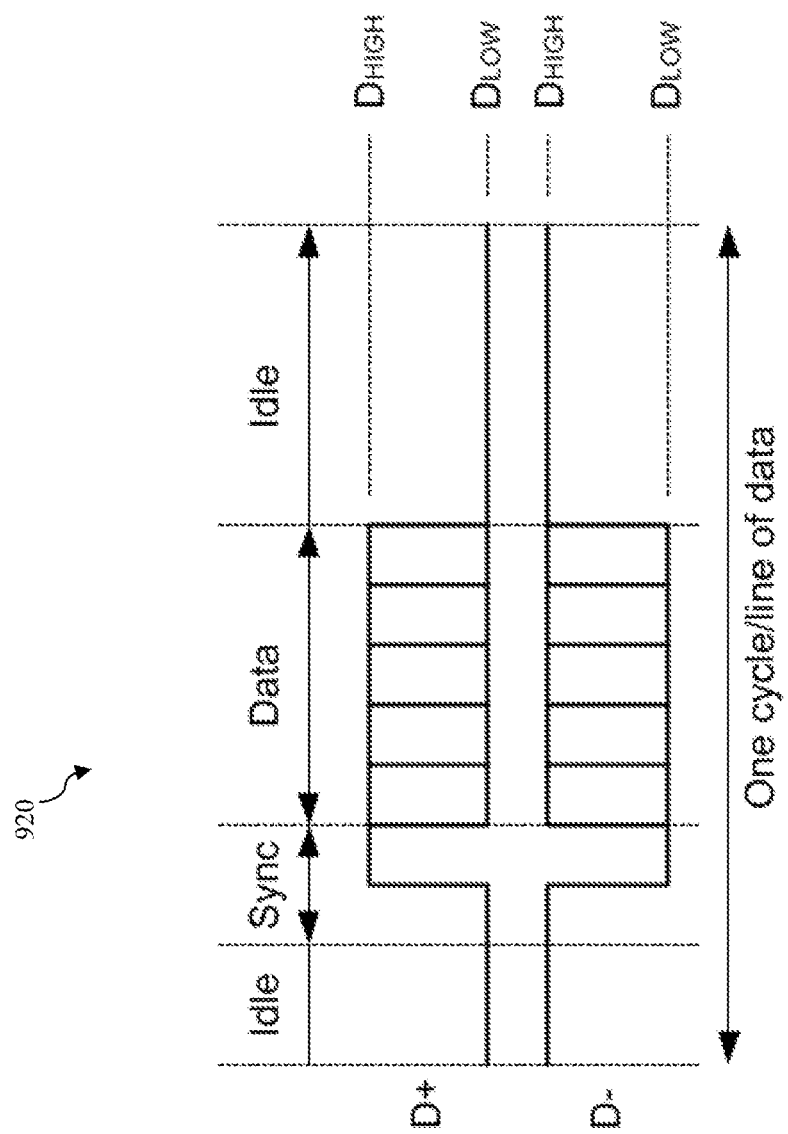
FIG. 11B illustrates an example of differential signaling, synchronization and digital data communication in accordance with one or more embodiments.

By ensuring a differential signaling scheme is used for all communications, the emitted and received EMI will be significantly reduced. FIG. 11B shows an example of differential signaling 920 starting with an idle period, following by a synchronization signal, then data and then going idle again. The idle period should also be of differential nature to avoid common mode noise, which means the terminations on one line should be ending in a high level and the other in a low level to avoid static power consumption during the idle period and thereby enable very low power consumption for modest bandwidth requirements.

Figure 11C:
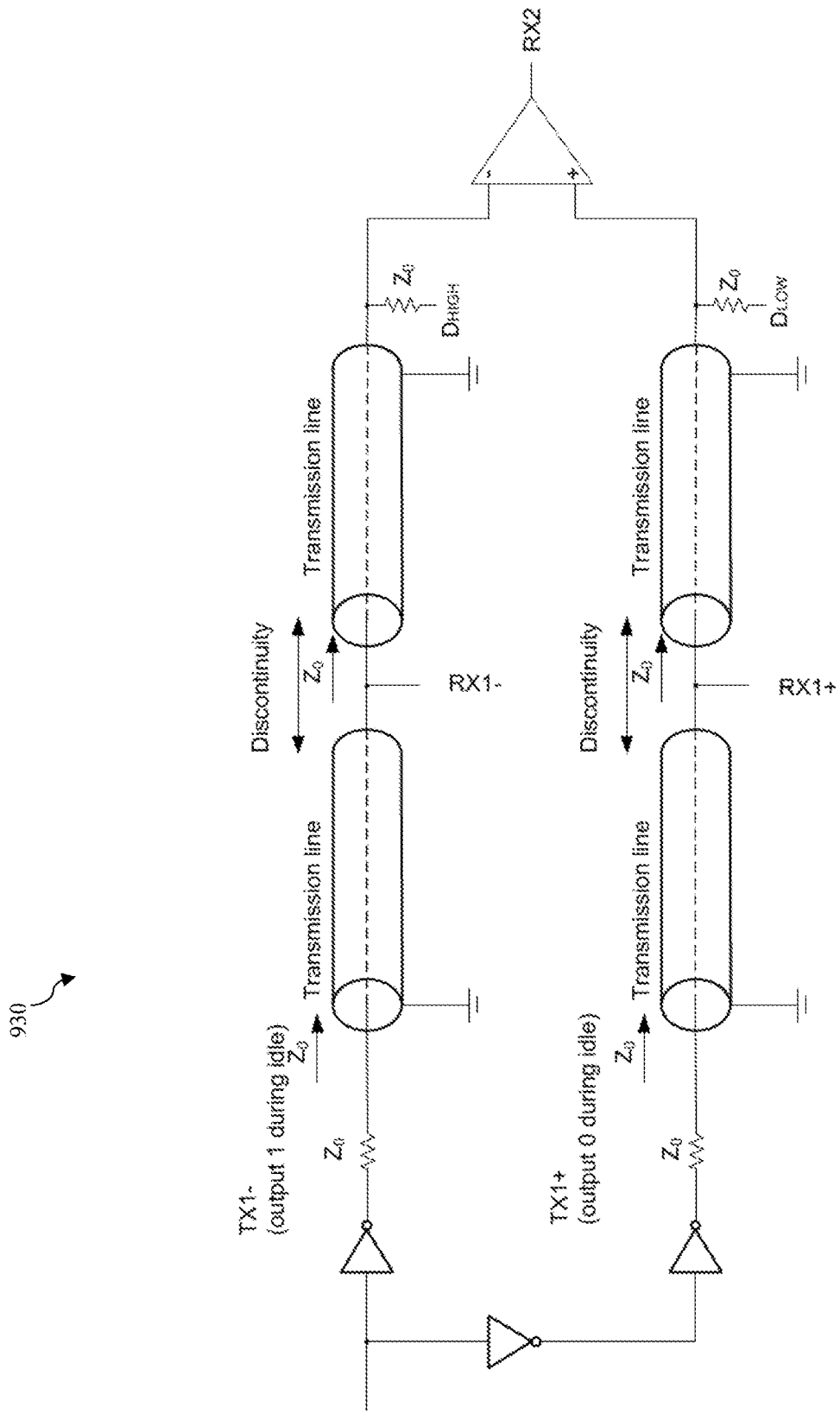
FIG. 11C illustrates and example differential signaling system in accordance with one or more embodiments.
Figure 11D:
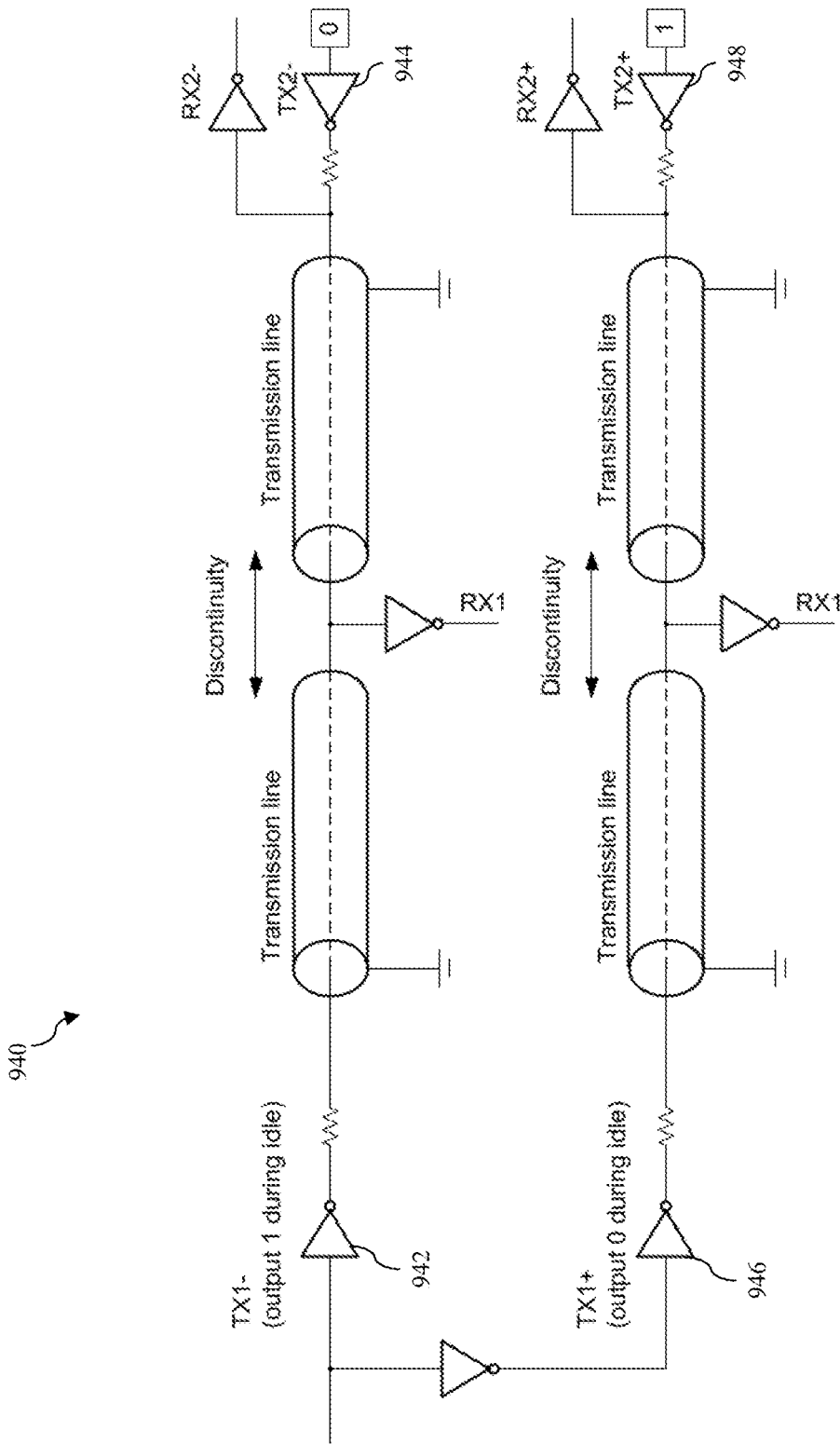
FIG. 11D illustrates another example of a differential signaling system in accordance with one or more embodiments.

FIG. 11C shows an example of a differential signaling system 930 with terminations to the high and low signaling voltage to ensure lowest possible EMI and lowest possible power consumption in idle mode. FIG. 11D shows a similar example of a differential signaling system 940, where the transmitters 942, 944, 946 and 948, at each end are used as serial terminations of the bus, thereby lowering the power consumption at the end nodes, due to the absence of termination loads. When the bus drivers at each end are not signaling data, they will go to the idle state, signaling the correct termination voltage, thereby lowering power consumption in idle state. In some embodiments, one of the two transmission lines may use a power line instead of ground for shielding, thereby enabling the transfer of power also. Some embodiments may use 4 twisted wires instead of shielded coax-cables, e.g., including DATA+, DATA−, ground and power in four-wire twisted pair configuration for low EMI requirements. The ground and power line will further reduce EMI.

In some applications, it is important to minimize the audio noise induced by random signaling occurring on the bus. This may be done by changing signaling level of various sources on the bus, e.g. by using a pseudorandom generator at the transmitter and receiver of data ports thereby randomizing bus traffic and thereby lowering the spectral content in the audio band. In some cases, the randomization may be perform with spectral sharpening, so the spectral content in the audio band is even lower by multiplexing the data signals with a high frequency content, e.g. by multiplexing every row with a certain random or predefined value. In some cases, the randomization may be performed by simply multiplying the rows with a carrier outside the audible bandwidth.

In some cases, the randomization may be performed using a delta-sigma modulator with a known pattern such as to not only randomize the output from various transmitters and thereby reduce any audio disturbance, but furthermore even noise-shape the output spectrum of the noise by deliberately controlling the noise transfer function of the modulator.

Cable Specifications

Exemplary cable specifications in accordance with various embodiments will now be described. For in-ear headsets a thin cable may be used to satisfy user requirements, such as a shielded configuration that uses thin AWG34 wire. For longer links or for large headsets and headphones, it may be possible to use thicker cable, which also lowers the attenuation a bit, an example would be a double twisted pair of cables similar to CAT5 requirements (wire type AWG24), except only 4, not 8 wires are needed. For example, standard 100BASE-TX cabling can be used. The attenuation for a link of 15 meters would be 66 db/100 m×15 m=9.9 dB or 3.1 times. Thus, the difference between the transmit voltage and the maximum receiver hysteresis should take this into account.

Intermediate Nodes

Exemplary embodiments with intermediate nodes will now be described. In various embodiments, end nodes have a series output impedance of $Z_0$ in order to be matched to the transmission line, while intermediate nodes will look into an impedance of ½ $Z_0$ (because intermediate nodes will essentially look into two transmission line each with impedance $Z_0$). It is often desirable to provide the same performance for all nodes. In various embodiments, (i) each node has an output voltage of U0; and (ii) each end node has an output impedance of $Z_0$. The impedance of intermediate nodes will result in reflected waves if they are active while a travelling wave reaches the node. This situation can be avoided by proper timing of the signals, i.e. each node first transmits signals after the signal waves with previous transmitted information have passed. The travelling waves will ultimately be absorbed at the transmission line ends. Exemplary transmission line impedance and signaling voltages may include $Z_0$=75Ω, $U_0$=250 mV, with differential signaling being used.

Additionally, intermediate nodes on the transmission line will face two line inputs, and if their output impedance is the same as the nodes located at the far ends of the transmission line, the output signaling voltages will be lower. This can be corrected either by using lower output impedances for intermediate nodes, by increasing the output driving voltages of intermediate nodes or by adjusting receivers on the transmission line to a lower threshold voltage.

Startup Sequence

An exemplary startup sequence will now be described with reference to FIG. 12. In various embodiments, the normal signaling is differential, two-level signaling. However, to obtain a unique pattern for start-up condition and for resynchronization after possible slave failure or after a power-down condition, the master may be configured to send out a third or different higher voltage level. This level will not be used for data transmission but only for resynchronization of slave devices. This will not impact the emitted EMI, because this higher level is only used during initial synchronization (e.g., first 1 ms). In one embodiment, the start-up sequence consists of 12 bit slots with a voltage level of double of the normal signaling level. In various embodiments, immediately after the start-up sequence will follow the synchronization edge used by the PLL. The start-up sequence will not be transmitted during normal operation to lower EMI and to increase available bandwidth. In the illustrated embodiment, during startup or resynchronization, the master will have approximately 62.5% left of the original bandwidth (using 12.288 MHz clock frequency) and 40% left of normal bandwidth in 9.60 MHz operation mode.

Exemplary signaling voltages are illustrated in the table, below.

| Parameter | Min | Max | Unit |
|---|---|---|---|
| Signaling voltage high | 250 | 350 | mV |
| Signaling voltage low | −75 | 75 | mV |
| Receive low | −300 | 100 | mV |
| Receive high | 200 | 1200 | mV |

In various embodiments, to ensure a safe startup mechanism for a slave device, a higher voltage level is used on the bus line when a slave device needs to get back in sync again. This higher voltage will be used to distinguish between normal data traffic and reset conditions. It may also be used for power-up circuits for low power wake-up (e.g. wake up word) while the bus is running. The higher bus voltage may be on for a longer time than a normal data symbol to avoid random noise on the bus to trigger the wakeup circuit and to lower power consumption. To get reasonable tolerances, good noise immunity and low power consumption, it is suggested the wake-up event will consist of a trail of 12 bit slots. This is equivalent to a minimum on-time of about 89 ns at a highest bit clock of 134.400 MHz.

Figure 12:
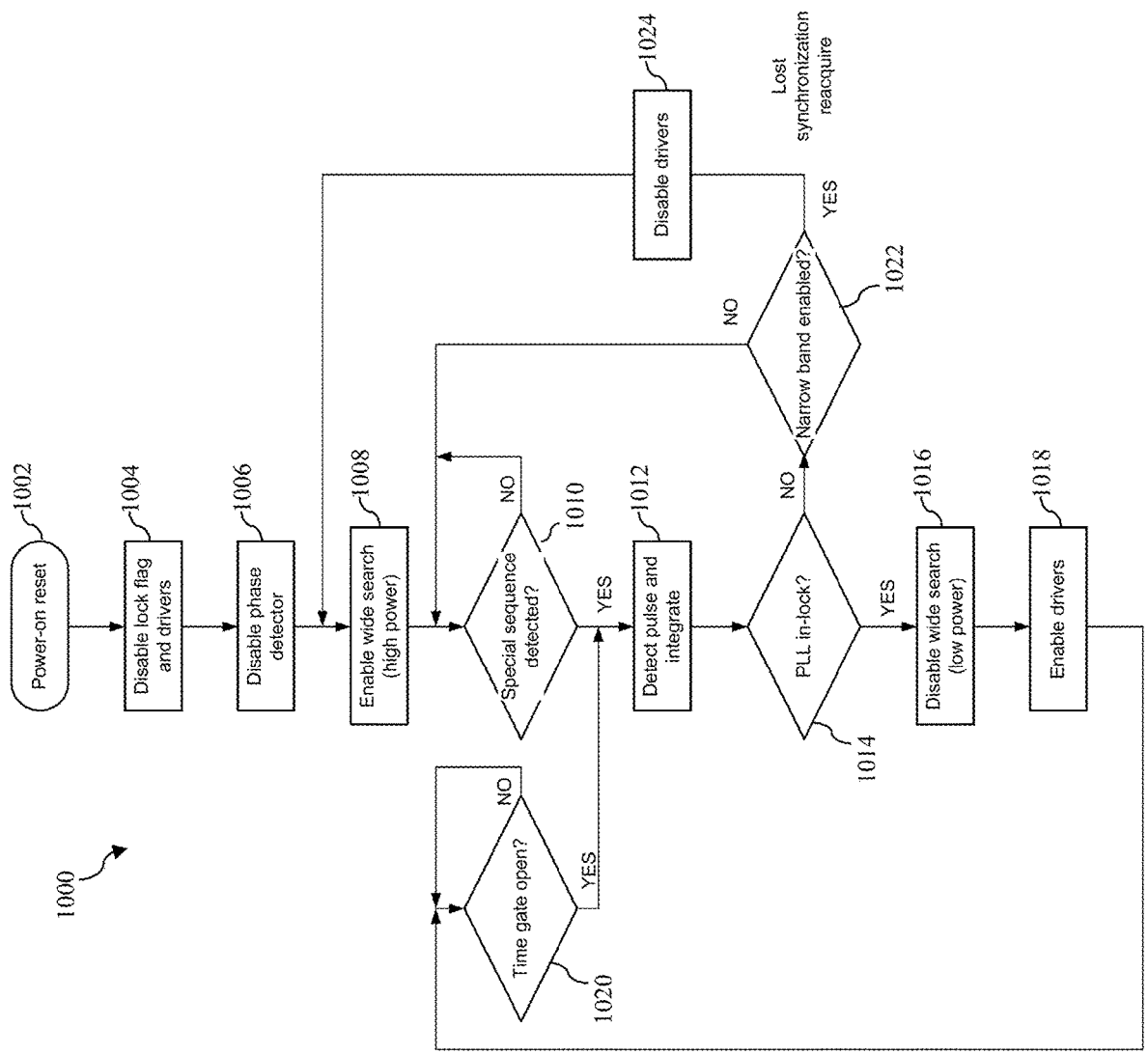
FIG. 12 illustrates an exemplary PLL lock sequence in accordance with one or more embodiments.

Referring to FIG. 12, the system is powered on in step 1002, and the lock flag and driver are disabled (step 1004) and the phase detector is disabled (step 1006). In step 1008, a wide search is enabled to detect devices. If a special sequence is detected for a device in step 1010, then the sync pulse is detected in step 1012. If a special sequence is not detected for a device, then the step is repeated until a device is detected. In step 1014, if the PLL is in-lock, then the wide search is disabled (step 1016), and drivers are enabled (step 1018). The sync sequence (steps 1012-1018) repeat when the time gate is open (step 1020). If the PLL is not in-lock (step 1014) and narrow band is enabled (step 1022), then the drivers are disabled in step 1024 and control passes to step 1008 to repeat the wide search at high power.

Figure 13:
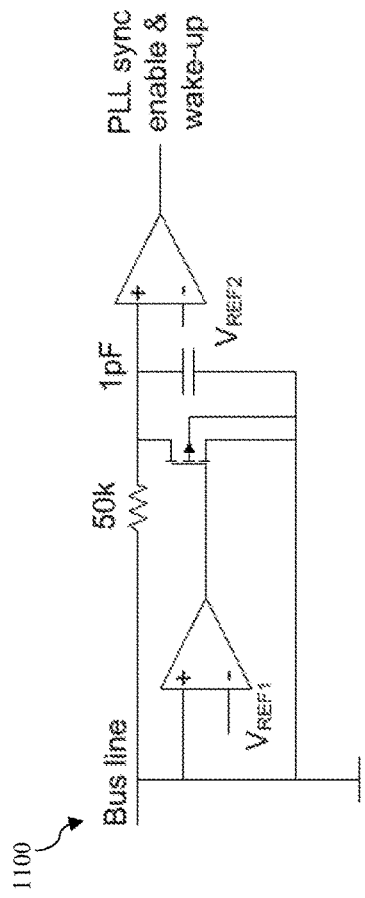
FIG. 13 is an exemplary PLL sync enable circuit in accordance with one or more embodiments.

The operation of a special start-up circuit 1100 will now be described with reference to FIG. 13. During normal operation, there will be no start-up sequence and the output from this circuit will be zero. The output from this circuit is used until the PLL gets in lock. In operation, the circuit will filter the input from the bus and if the bus has been above a certain high threshold for a certain time, enable the PLL to look at the next high-to-low transition. When the bus level is at low, the circuit will discharge any accumulated charge and start over again looking for an uninterrupted sequence of a high value.

| Parameter | Min | Max | Unit |
|---|---|---|---|
| VREF1 | 250 | 350 | mV |
| VREF2 | 500 | 600 | mV |
| Low to reset | 0 | 8 | ns |
| High to enable PLL | 50 | 100 | ns |

The length of this series of logical ones will depend on the clock frequency and the length of the series. This may be used by an analog circuit to check for the start of sync under error conditions.

The output from the phase detector is enabled after 50 ns (at most 120 ns) or logical ones followed by a logical zero. This enables audio transfer even during faults using at most 4 consecutive time slots in the illustrated embodiment. During fault conditions, the first 4 columns are reserved for audio transfers, while every $5^{th}$ columns is used to send a logical zero, followed by more audio until the start of the sync pulse. After the 0-1 transition, the phase detector output is disabled again. In one embodiment, after a slave device has obtained lock, it looks inside a narrow window determined by the current lock position for the sync transition and ignores all other bus traffic.

Lock-on Detector

| Parameter | Min [ns] | Max [ns] |
|---|---|---|
| Enable | 50 | 120 |
| Reset time | 0 | 8 |

Exemplary signaling solutions will now be described. In a first signaling sequence solution:

Three-level signaling is used: {−1, 0, +1} as signaled by {low, zero, high} for reduced EMI, similar to CATS signaling.

Logical zero: Same level as before (four zeros may be followed by a value from the reverse sequence, i.e. going in opposite direction after several zeros to ensure safe start detection).

Logical one: The next value in sequence of trinary values, e.g., multiple ones will be signaled as the sequence {zero, high, zero, low, zero, high, low etc.}. The sync value will then use a different sequence e.g. {high, low, high, low} or {zero, high, zero, high} than possible by legal data values to distinguish between sync and data. In other words, trinary encoding enables a receiver to reliably distinguish between sync and data while enabling a reduction of the EMI by lowering the harmonics generated.

In a second signaling sequence solution, two-level signaling is used. In one embodiment, no device except the master can own more than 4 time-slots in a row, or a zero will be inserted between packets. If multiple devices sent data out after each other, spacing is used between for every 4 bits and a zero inserted. If an analog delay circuit can be made with more narrow tolerances than stated above, more bits can be transported in sequence. This is an example where bandwidth is traded off to enable a special encoding of sync symbols that is different from any legal data value. Other encoding schemes such as 8/10B encoding could be used to distinguish between sync and data.

Figure 14:
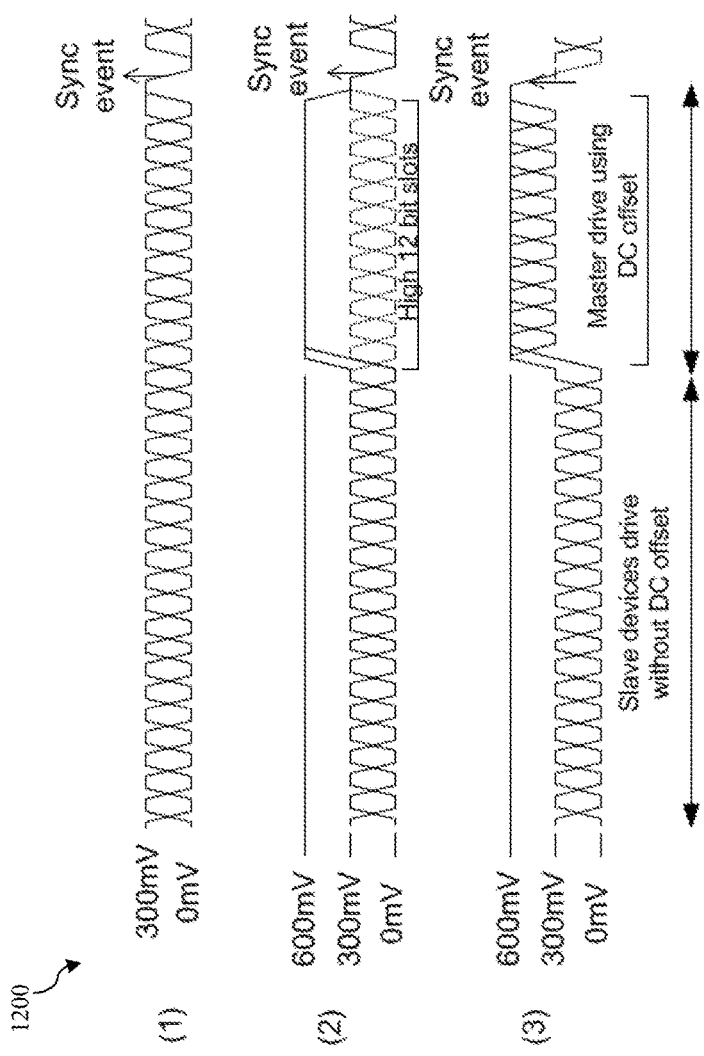
FIG. 14 illustrates exemplary synchronization signaling in accordance with one or more embodiments.

In a third signaling sequence solution, a DC-offset is applied to all signaling from the master, while slaves will use no DC-offset. This change in DC-offset can be reliably be detected by slaves and thereby sync can always be obtained, regardless of the current signaling pattern on the bus and any previous encountered state inside any slave device. FIG. 14 (3) illustrates an example of this solution.

High Speed Transition

Figure 15:
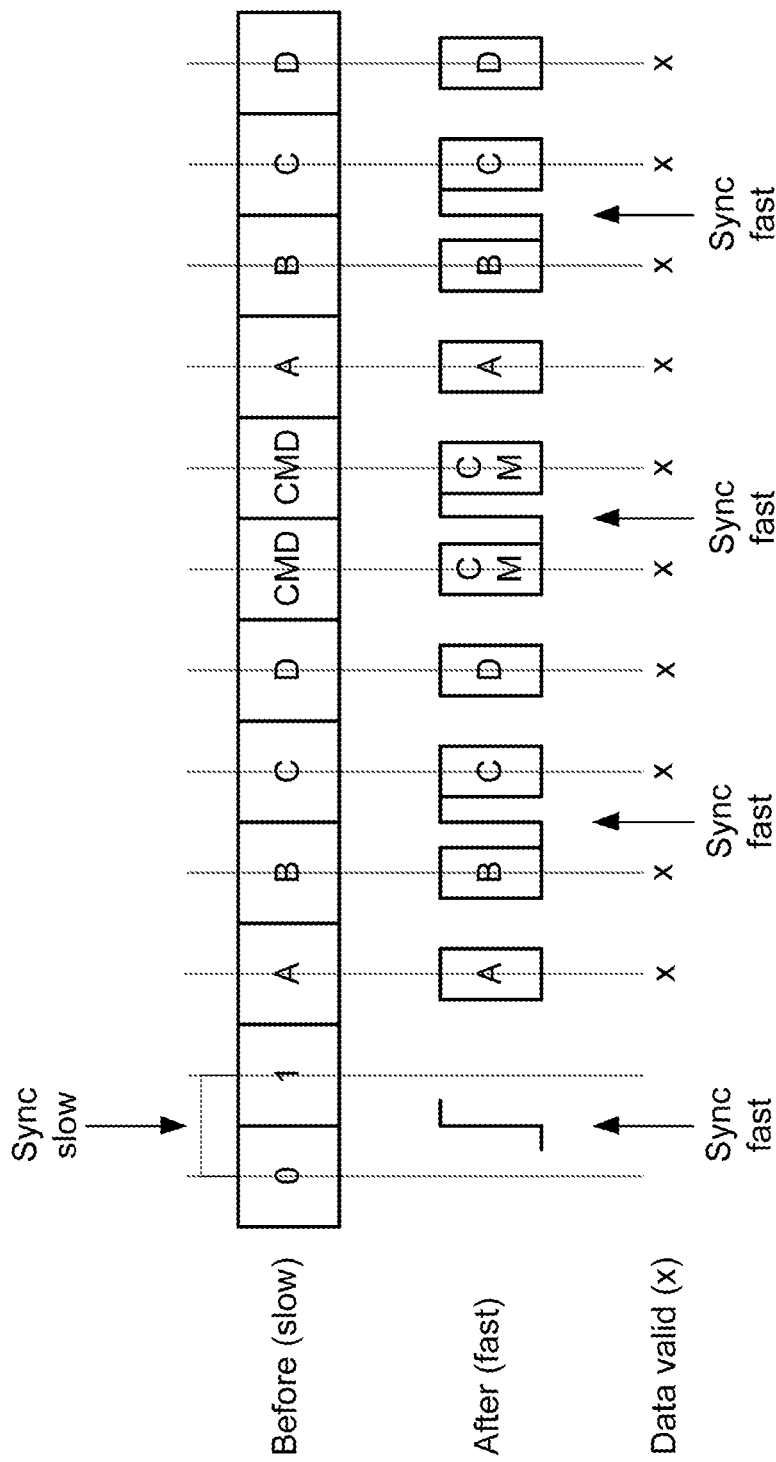
FIG. 15 illustrates an exemplary operation of a digital data communications system in accordance with one or more embodiments.

Referring to FIG. 15, an embodiment of an operation of the present disclosure will be described. In one embodiment, 250 mV signaling may be used for both a slow and a fast mode, and the sync edge of the received signal inside the gated time window is used for audio sampling. In a slow speed mode, there is no extra power consumption on the bus if the PHUI (Physical Unit Interval, a measure of the duration of each time slot used in the frame definition) is not driven and there is little extra power consumption from the internal PLL running at a higher rate. Therefore, a higher frequency for the slow mode may be selected which is used as a low power mode. In slow speed mode, devices can check sync relatively easily (e.g., 2 slots out of 12 used for sync). In one embodiment, all devices are maintained in sync at all times. In another embodiment, devices may enter a sleep mode and wait for a special VDD wakeup signal, which will induce a delay (e.g., 1 ms) before they are functional.

In one or more embodiments, a transition to high speed starts in slow mode with slow sync (e.g., 768 kHz). Extra sync symbols are inserted to prepare for high speed mode and PHUIs are made shorter but transitions are maintained. Symbols are assumed to be read in the middle of the transmit interval. The extra sync symbols are not seen by slow mode devices. Each transmitter includes an internal clock running at least twice the original PHUI clock to insert the shorter symbols. In high speed mode, there are now more time slots. In various embodiments, a slow device may read in a fast mode. This solution enables a change in bandwidth and sync repetition rate while keeping audio running and having both slow and fast devices attached to the bus at the same time. It basically inserts sub-intervals in the existing timing and uses these sub-intervals to add bandwidth to the existing transfer protocol.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a device controller coupled to a first interface for digital audio data communications in accordance with a first communications protocol, the device controller including a master bus controller for controlling a multi-drop bus in accordance with a second communications protocol; and
a first slave device coupled to the multi-drop bus and configured to transmit and receive digital audio data communications with the device controller in accordance with the second communications protocol;
wherein each transmission line of the multi-drop bus is terminated using the first slave device attached at one end of the transmission line and by the device controller attached at the other end of the transmission line and wherein the multi-drop bus is configured to support one or more intermediate signaling nodes such that reflections due to mismatches in impedance by inclusion of the intermediate signaling nodes are controlled to allow multi-drop device support and high speed signaling;
wherein the intermediate signaling nodes are connected to the transmission lines with short interruption to a travelling wave, and wherein stubs and/or disruptions of the transmission lines are shorter than the shortest wavelength used for signaling; and
wherein the second communications protocol supports multiple audio data rates using a fixed frame format.

2. The system of claim 1 wherein the first slave device and a second slave device connected to the bus are timed so that transmitted messages are either sent as a sequence of forward or backward travelling waves, thereby enabling multi-drop high speed bi-directional communications using the terminated transmission line.

3. The system of claim 1, wherein the second communications protocol uses differential signaling for lower electromagnetic interference and wherein a first line is terminated in logic high and a second line is terminated in logic low to reduce common mode interference.

4. The system of claim 1, where differential signaling is used to lower electromagnetic interference and wherein termination of each transmission line is handled by setting an output driver to one of a high level and a low level according to a termination level when data are not transferred and the bus is idle, thereby enabling lower power consumption by transmission end points.

5. The system of claim 1, wherein power consumption is reduced by using a signaling rate that is greater than a minimum required signaling rate and leaving the bus idle for a portion of every cycle, thereby reducing power loss in terminations.

6. The system of claim 1, wherein power required for the signaling are obtained by capacitive or inductive drop regulators thereby minimizing power loss in the regulators.

7. The system of claim 1, wherein delays between components are measured by charging the bus to a known value, disabling drivers at a beginning and an end of the transmission line to assure the bus is floating and not terminated during measurement, waiting for the devices to change a level on the bus, and measuring a transition delay.

8. The system of claim 7, wherein the drivers at each end of the transmission line are disabled during enumeration of components attached to the bus by allowing multiple drivers to change a current bus state; and wherein the current bus state is set by a controller and one or more devices can change the transmission line to the opposite value within a given time window allowing enumeration of devices.

9. The system of claim 1 wherein the device controller further comprises a phase-locked loop providing a first clock signal for synchronizing communications in accordance with the first communications protocol, a second clock signal for synchronizing communications in accordance with the second communications protocol, and a third clock signal for use in audio data processing.

10. The system of claim 1 wherein the second communications protocol supports different communications bandwidths.

11. The system of claim 1 wherein the second communications protocol supports different communications bandwidth using a fixed frame structure.

12. The system of claim 1, wherein each data port or data following each sync signal is modulated by a high frequency carrier thereby reducing current modulations in an audio band for lower interference in audio systems.

13. The system of claim 1 wherein the device controller, first slave device and second slave device comprise an audio headset.

14. The system of claim 1 wherein terminations at the ends of the transmission lines are temporarily disabled during activation of device transmitters to reduce power consumption.

15. A method comprising:
receiving and transmitting, using a device controller, digital audio data across a first interface in accordance with a first communications protocol;
controlling, using the device controller, a multi-drop bus comprising a plurality of transmission lines in accordance with a second communications protocol;
receiving and transmitting, by a first slave device coupled to the multi-drop bus, the digital audio data with the device controller in accordance with the second communications protocol, the transmission lines terminating at the device controller and first slave device; and
controlling multi-drop bus communications with at least one intermediate signaling node connected to the multi-drop bus through stubs that are shorter than the shortest wavelength used for signaling, and wherein reflections due to mismatches in impedance by inclusion of the at least one intermediate signaling node in the second communications protocol are controlled to allow multi-drop device support and high speed signaling;
wherein the second communications protocol supports multiple audio data rates using a fixed frame format.

16. The method of claim 15 further comprising using a phase-locked or delay-locked loop to generate a first clock signal for synchronizing communications in accordance with the first communications protocol, a second clock signal for synchronizing communications in accordance with the second communications protocol, and a third clock signal for use in audio data processing.

17. The method of claim 15 wherein the second communications protocol supports different communications bandwidths.

18. The method of claim 15 wherein the second communications protocol supports different communications bandwidths using a fixed frame structure.

19. The method of claim 15 wherein the device controller, first slave device and second slave device comprise an audio headset.

20. The method of claim 15, further comprising setting transmitters at each end of a transmission line to a known state to disable terminations during measurement of a turn-around delay from the slave device to the device controller.

* * * * *